(12) United States Patent
Poustchi et al.

(10) Patent No.: US 7,751,546 B2
(45) Date of Patent: Jul. 6, 2010

(54) CALL TRANSFER SYSTEM, METHOD AND NETWORK DEVICES

(75) Inventors: Behrouz Poustchi, Kanata (CA); Natalie Ann Gagnon, Carleton Place (CA); Vineet Seth, Kanata (CA)

(73) Assignee: Avaya Canada Corp., Halifax, Nova Scotia (CA)

( * ) Notice: Subject to any disclaimer, the term of this patent is extended or adjusted under 35 U.S.C. 154(b) by 1925 days.

(21) Appl. No.: 10/762,754

(22) Filed: Jan. 22, 2004

(65) Prior Publication Data

US 2005/0021872 A1 Jan. 27, 2005

Related U.S. Application Data

(60) Provisional application No. 60/441,481, filed on Jan. 22, 2003.

(51) Int. Cl.
*H04M 3/42* (2006.01)

(52) U.S. Cl. .................. 379/211.02; 370/230; 370/352; 370/397; 379/198; 379/219; 379/229; 379/386; 455/445; 455/462; 715/736

(58) Field of Classification Search ............ 379/211.01, 379/212.01, 88.19, 212.02, 167.02, 265.09, 379/87, 88.14, 93.02, 114.01, 207.02, 198, 379/211.02, 219, 229, 266.01, 386; 709/220, 709/217, 223, 226; 455/415, 445, 462; 370/230, 370/352, 397; 713/166, 170; 715/736
See application file for complete search history.

(56) References Cited

U.S. PATENT DOCUMENTS

| | | | | | |
|---|---|---|---|---|---|
| 5,249,221 | A | * | 9/1993 | Ketring | 379/214.01 |
| 5,274,700 | A | * | 12/1993 | Gechter et al. | 379/211.01 |
| 5,617,471 | A | * | 4/1997 | Rogers et al. | 379/212.01 |
| 5,649,004 | A | * | 7/1997 | Ikeno et al. | 379/198 |
| 5,881,142 | A | * | 3/1999 | Frankel et al. | 379/167.02 |
| 5,946,386 | A | * | 8/1999 | Rogers et al. | 379/265.09 |
| 5,963,620 | A | | 10/1999 | Frankel et al. | 379/93.05 |
| 6,038,293 | A | * | 3/2000 | McNerney et al. | 379/88.19 |
| 6,144,671 | A | | 11/2000 | Perinpanathan et al. | 370/409 |
| 6,161,134 | A | * | 12/2000 | Wang et al. | 709/220 |
| 6,215,865 | B1 | * | 4/2001 | McCalmont | 379/212.01 |
| 6,253,088 | B1 | * | 6/2001 | Wenk et al. | 455/462 |
| 6,320,951 | B1 | * | 11/2001 | Shtivelman et al. | 379/211.01 |
| 6,466,662 | B1 | | 10/2002 | Klaghofer et al. | 379/212.01 |

(Continued)

OTHER PUBLICATIONS

SIP Call Control—Transfer [online], [retrieved on Mar. 31, 2004.] Retrieved from the Internet <URL:http://www.ietf.org/proceedings/02nov/I-D/draft-ietf-sip-cc-transfer-05.txt>.

(Continued)

*Primary Examiner*—Gerald Gauthier
(74) *Attorney, Agent, or Firm*—Muncy, Geissler, Olds & Lowe, PLLC

(57) ABSTRACT

In a call transfer of a call there is an original calling network device, an original recipient of the call, and a transferee of the call. Systems, network devices, and methods are provided for delivering local call transfer functionality. Each network device is capable of functioning in the capacity of any one or more of the above three roles, namely, originator, original recipient, and transferee by providing local call transfer functionality. There is no requirement for central processing equipment used to provide local call transfer functionality for transferring calls.

57 Claims, 20 Drawing Sheets

U.S. PATENT DOCUMENTS

| | | | |
|---|---|---|---|
| 6,574,335 B1* | 6/2003 | Kalmanek et al. | 379/386 |
| 6,714,217 B2* | 3/2004 | Huang et al. | 715/736 |
| 6,816,583 B2* | 11/2004 | Roeder | 379/212.01 |
| 6,876,627 B1* | 4/2005 | Rao | 370/230 |
| 6,999,769 B1* | 2/2006 | Henon | 455/445 |
| 7,012,915 B1* | 3/2006 | Carr | 370/352 |
| 7,106,848 B1* | 9/2006 | Barlow et al. | 379/212.01 |
| 7,120,241 B1* | 10/2006 | Fuoss et al. | 379/212.01 |
| 7,203,297 B2* | 4/2007 | Vitikainen et al. | 379/207.02 |
| 7,236,772 B1* | 6/2007 | Botzas | 455/415 |
| 7,280,530 B2* | 10/2007 | Chang et al. | 370/352 |
| 7,283,624 B1* | 10/2007 | Meek et al. | 379/114.01 |
| 7,324,526 B1* | 1/2008 | Kulkarni et al. | 370/397 |
| 7,463,619 B1* | 12/2008 | Prokop et al. | 370/352 |
| 2003/0043787 A1* | 3/2003 | Emerson, III | 370/352 |
| 2003/0088672 A1* | 5/2003 | Togasaki | 709/226 |
| 2003/0101343 A1* | 5/2003 | Eaton et al. | 713/170 |
| 2003/0185375 A1* | 10/2003 | Albal | 379/220.01 |
| 2004/0117624 A1* | 6/2004 | Brandt et al. | 713/166 |
| 2004/0215740 A1* | 10/2004 | Frank et al. | 709/217 |
| 2006/0020694 A1* | 1/2006 | Nag et al. | 709/223 |
| 2006/0239253 A1* | 10/2006 | Gallant et al. | 370/352 |
| 2008/0259791 A1* | 10/2008 | Synnestvedt et al. | 370/230 |
| 2008/0279351 A1* | 11/2008 | Koch | 379/88.14 |
| 2009/0268881 A1* | 10/2009 | Luneau | 379/87 |
| 2009/0290695 A1* | 11/2009 | Schulzrinne et al. | 379/93.02 |

OTHER PUBLICATIONS

The Referred-By Mechanism [online], [retrieved on Mar. 31, 2004.] Retrieved from the Internet <URL:http://www.ietf.org/proceedings/02nov/I-D/draft-ietf-sip-referredby-00.txt>.

* cited by examiner

| DN | MAC ADDRESS | IP ADDRESS | DEVICE STATUS | BACKUP 1 | BACKUP 2 |
|---|---|---|---|---|---|
| 201 | 00-05-78-6B-44-A7 | 192.168.1.1 | 1 | 202 | 205 |
| 202 | 00-05-78-6B-44-A8 | 192.168.1.2 | 1 | 201 | 203 |
| 203 | 00-05-78-6B-44-A9 | 192.168.1.3 | 1 | 202 | 204 |
| 204 | 00-05-78-6B-44-B0 | 192.168.1.4 | 1 | 203 | 205 |
| 205 | 00-05-78-6B-44-B1 | 192.168.1.5 | 1 | 201 | 204 |
| T01 | 00-05-78-6B-44-B2 | 192.168.1.6 | | | |

FIG. 5

CALL TRANSFER SYSTEM, METHOD AND NETWORK DEVICES

RELATED APPLICATION

This Application claims the benefit of U.S. Provisional Application 60/441,481 filed Jan. 22, 2003 which is hereby incorporated by reference in its entirety.

FIELD OF THE INVENTION

This invention relates generally to call transfer systems, methods and network devices in for example a distributed peer-to-peer network.

BACKGROUND OF THE INVENTION

Some modern communications solutions are based on VoIP (Voice-over IP (Internet Protocol)) technology, which is the transmission of calls over a data network based on the IP. The communication is in the form of packet data and thus there is no fixed connection as there would be in the case of switched networks. The communication can be text, voice, graphics or video. In order to simplify IP communication problems, standards have been developed and adopted in the industry. Examples of such standards are H.323 (Packet based communication systems) and SIP (Session Initiation Protocol). These standards are followed when designing new hardware and software. The SIP standard covers the technical requirements to set-up, modify and tear down multimedia sessions over the Internet. A multimedia communication session between two endpoints will be referred to as a call.

Communication solutions, whether they be switch based or packet based, are defined and designed for a specific number of users and call processing capacity, generally defined by the number of ports (telephone terminations), and the amount of processing available on a central processing equipment that provides routing and call processing functionality. Hence, equipment vendors generally develop and market versions of the same product for different customer size and needs. However, a customer needs to upgrade to larger central processing equipment once the number of ports required and/or call-processing requirements exceed the capacity of the central processing equipment.

Current multimedia communication systems use a central processing equipment and simple user terminal sets. These simple user terminal sets are referred to as "stimulus terminals" as they simply send user stimuli such as key presses to the central processing equipment. In large systems, the central processing equipment is generally a very powerful computer controlling a number of functions on circuit boards called line cards, which connect telephone sets to the computer. The central processing equipment receives hookswitch information and key presses known in the art as DTMF (Dual Tone Multi-Frequency) tones from the telephone sets, and provides feedback to the telephone sets for example by sending a dial-tone or a ringing tone to the telephone sets. By interpreting the key presses, the central processing equipment controls the interconnection of the telephone sets based on numbers dialed by the telephone sets.

Call transfer has been provided as part of the central call processing equipment. There are two types of call transfers namely, blind or consultative transfers. To perform a blind transfer while on a call, a user presses a transfer key or presses the switchhook momentarily. The central call processing equipment places the call on hold and a special dial tone is provided to the user to dial a new destination number. Once the user hears a ringing tone he or she may hang up to complete the transfer. To perform a consultative transfer while on a call a user presses a transfer key or depresses the switchhook momentarily. The central call processing engine places the call on hold and a new dial tone is provided to the user to dial the destination number. Once the destination party answers the user may consult with the destination. The user hangs up to complete the transfer. In both blind and consultative transfers, it is the central call processing engine that places a call on hold and establishes a media path with a new destination. Such a system is not well suited for scalability. In addition, centralized equipment adds costs to the total cost of the communication solution.

SUMMARY OF THE INVENTION

In a call transfer of a call there is an original calling network device, an original recipient of the call, and a transferee of the call. Systems, network devices, and methods are provided for delivering call transfer functionality in a manner such that the call processing involved is performed locally on the network devices themselves without the requirement for central processing equipment. Each network device is capable to function in the capacity of any one or more of the above three roles, namely originator, original recipient, and transferee by providing local call transfer functionality. As the requirement for central processing equipment is removed, network devices can be added to a system without incurring high costs of replacing central processing equipment when a system becomes large.

According to a broad aspect, the invention provides a network device adapted to process a call between the network device and a first other network device, the network device having a call transfer function and a user interface adapted to receive a user input requesting a call transfer to a second other network device. The call transfer function is responsive to the user input to deliver call transfer functionality by, upon receipt of the user input: a) initiating a connection from the network device to the second other network device; and b) sending a first message to the first other network device containing a reference to the second other network device.

In some embodiments of the invention, the second message contains a reference to the connection.

In some embodiments of the invention, the network device is one of a telephone, a video phone, a PDA (Personal Digital Assistant), a soft phone, a wireless device, a wireless telephone, a cell phone, and a VoIP (Voice over Internet Protocol) telephone.

According to another broad aspect, the invention provides a network device adapted to process a call between the network device and a first other network device. The network device has a call transfer function adapted to participate in a call transfer of the call by: responding to a first message from the first other network device containing a reference to a second other network device by establishing a media path with the second other network device.

In some embodiments of the invention, the network device is one of a telephone, a video phone, a PDA (Personal Digital Assistant), a soft phone, a wireless device, a wireless telephone, a cell phone, a TTI (Thin Trunk Interface), and a VoIP (Voice over Internet Protocol) telephone.

According to another broad aspect, the invention provides a network device having a call transfer function being adapted to participate in a call transfer of a call between a first other network device and a second other network device by; after receiving a first message from the second other network device initiating a connection between the network device and the second other network device, responding to a second message from the first other network device containing a reference to the second other network device by replacing a connection between the network device and the second other network device with an other connection between the network device and the first other network device.

In some embodiments of the invention, the second message contains a reference to the connection between the network device and the second other network device.

In some embodiments of the invention, the network device is one of a telephone, a video phone, a PDA (Personal Digital Assistant), a soft phone, a wireless device, a wireless telephone, a cell phone, a TTI (Thin Trunk Interface), and a VoIP (Voice over Internet Protocol) telephone.

According to another broad aspect, the invention provides in a network, a system having a plurality network devices on the network. Each network device has a user interface adapted to receive a user input requesting a call transfer and a call transfer function. The call transfer function adapted to: (i) participate in a call transfer of a first call between the network device and a first other network device using local call transfer functionality, the first call being transferred to a second other network device, (ii) participate in a call transfer or a second call between the network device and a first other network device using local call transfer functionality, the second call being transferred to a second other network device; and (iii) participate in a call transfer of a third call between a first other network device and a second other network device using local call transfer functionality, the third call being transferred to a network device.

In some embodiments of the invention, the system further has a TTI having a call transfer function adapted to provide local call transfer functionality as a transferee of a call for network devices external to the network.

In some embodiments of the invention, the system further has a TTI having a call transfer function adapted to provide local call transfer functionality as an originator of a call for network devices external to the network.

According to another broad aspect, the invention provides a method. The method involves processing a call between the network device and a first other network device and responsive to receiving a user input requesting a call transfer to a second other network device, delivering call transfer functionality by: a) initiating a connection from the network device to the second other network device; and sending a message to the first other network device containing a reference to the second other network device.

According to another broad aspect, the invention provides a method. The method involves processing a call between the network device and a first other network device and participating in a call transfer of the call by: responding to a first message from the first other network device containing a reference to a second other network device by establishing a media path with the second other network device.

According to another broad aspect, the invention provides a method. The method involves participating device call transfer of call between a first other network device and a second other network device by: after receiving a first message from the second other network device initiating a connection between the network device and the second other network device, responding to a second message from the first other network device containing a reference to the second other network device by replacing the connection between the network device and the second other network device with an other connection between the network device and the first other network device.

BRIEF DESCRIPTION OF THE DRAWINGS

Preferred embodiments of the invention will now be described with reference to the attached drawings in which:

FIG. 5 is a routing table of a terminal set of FIG. 1;

DETAILED DESCRIPTION OF THE PREFERRED EMBODIMENTS

Embodiments provide blind transfer and/or consultative transfer. In some embodiments of the invention, network devices in a network provide call transfer functionality locally. In some embodiments of the invention, this call transfer functionality can be implemented as part of a call processing capability that incorporates other call processing features. An example implementation of an embodiment of the invention will be described in the context of call processing on a peer-to-peer distributed network, which incorporates call transfer, with reference to FIGS. 1 to 6.

Figure 1:
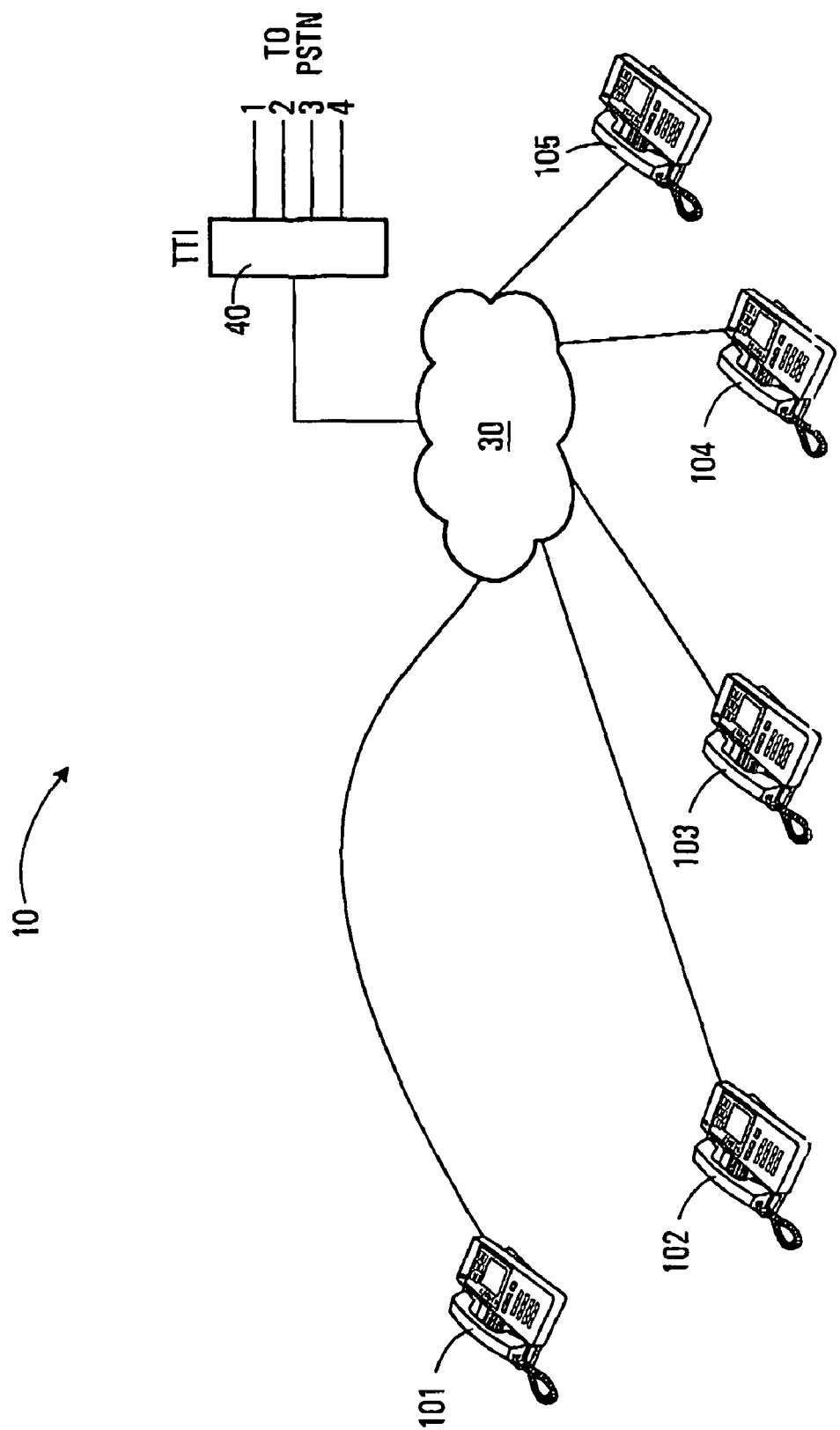
FIG. 1 is an example implementation of a system that makes use of network based distributed peer-to-peer call processing.

Referring to FIG. 1, shown is an example implementation of a system generally indicated by 10 which makes use of network based distributed peer-to-peer call processing. In addition to call transfer, in the example, call processing functionality such as call forwarding, call park and pickup, voice mail, and paging, and other features such as time synchronization, backup features, and peer discovery, may be provided locally at network devices within a network. Such features and functionality are described in U.S. Provisional Patent Application No. 60/441,481 entitled "DISTRIBUTED PEER-TO-PEER CALL TRANSFER SYSTEM, METHOD AND TELEPHONE TERMINALS" and filed Jan. 22, 2003; U.S. Provisional Patent Application No. 60/441,121 entitled "DISTRIBUTED PEER-TO-PEER CALL FORWARDING SYSTEM, METHOD AND TELEPHONE TERMINAL" and filed Jan. 21, 2003; U.S. Provisional Patent Application No. 60/434,813 entitled "DISTRIBUTED PEER-TO-PEER VOICE MAIL SYSTEM, METHOD AND TELEPHONE TERMINALS" and filed Dec. 20, 2002; U.S. Provisional Patent Application No. 60/473,877 entitled "DISTRIBUTED PEER-TO-PEER CALL PARK AND CALL PARK PICKUP SYSTEM, METHOD AND TELEPHONE TERMINALS" filed May 29, 2003; U.S. Provisional Patent Application No 60/518,646 entitled "PEER-TO-PEER DISCOVERY SYSTEM, METHOD AND NETWORK DEVICES" filed Nov. 12, 2003; U.S. Provisional Patent Application No. 60/523,703 entitled "PEER BACK-UP IN A DISTRIBUTED PEER-TO-PEER NETWORK: SYSTEM, METHOD AND NETWORK DEVICES" filed Nov. 21, 2003; U.S. Provisional Patent Application No. 60/523,140 entitled "TIME SYNCHRONIZATION OF NETWORK DEVICES IN A NETWORK: SYSTEM, METHOD AND NETWORK DEVICE" filed Nov. 19, 2003; U.S. Provisional Patent Application No. 60/524,041 entitled "SYSTEM, METHOD AND NETWORK DEVICES FOR PAGING IN A NETWORK" filed Nov. 24, 2003; U.S. patent application Ser. No. 10/740,405 entitled "VOICE MAIL SYSTEM, METHOD AND NETWORK DEVICES" filed Dec. 22, 2003, all of which are incorporated herein by reference. It is to be clearly understood that embodiments of the invention are also provided which only provide call transfer functionality.

The system 10 has a TTI (Thin Trunk Interface) 40 and five terminal sets 101, 102, 103, 104, 105 on a network 30. The network 30 may be for example a LAN (Local Area Network). In the example of FIG. 1 there are five terminal sets 101, 102, 103, 104, 105; however, more generally there are a total of N terminal sets where N≧2. Furthermore, in some implementations N can be a large number, for example in the thousands. The TTI 40 is, for example, a basic Analog or digital T1/E1 interface or any other suitable PSTN interface and provides a local central office or PSTN (Public Switched Telephone Network) interworking interface. The TTI 40 is coupled to a number of telephone "lines" 1, 2, 3, 4. Lines 1, 2, 3, 4 are wire pairs representative of facilities provided by a local central office or PSTN (not shown). In some implementations, there are many lines requiring multiple thin trunk interfaces. For example, in one implementation, 8 lines are required for connection to the PSTN and a second thin trunk interface is added to the system 10. It is to be understood that the system 10 of FIG. 1 is only a specific example of the incorporated subject matter. For example, in some implementations the network 30 form part of a larger network that is a collection of smaller networks interconnected by way of VPN (Virtual Private Network) connections for example.

In another example implementation there are two or more networks each having a TTI and at least one network device capable of providing call transfer functionality locally. An external call received from a network device on another network is routed through a respective TTI on the network on which the network device intended to receive the call resides. The network device receiving the external call provides local call transfer functionality for the external call if required. In the event that the network device intended to receive the call is unavailable the TTI through which the call is routed re-routes the call to another network device designated as a backup network device for the network device originally intended to receive the call.

Unlike conventional systems, the system 10 of FIG. 1 features distributed call processing, and a number of capabilities including distributed call transfer.

Figure 2:
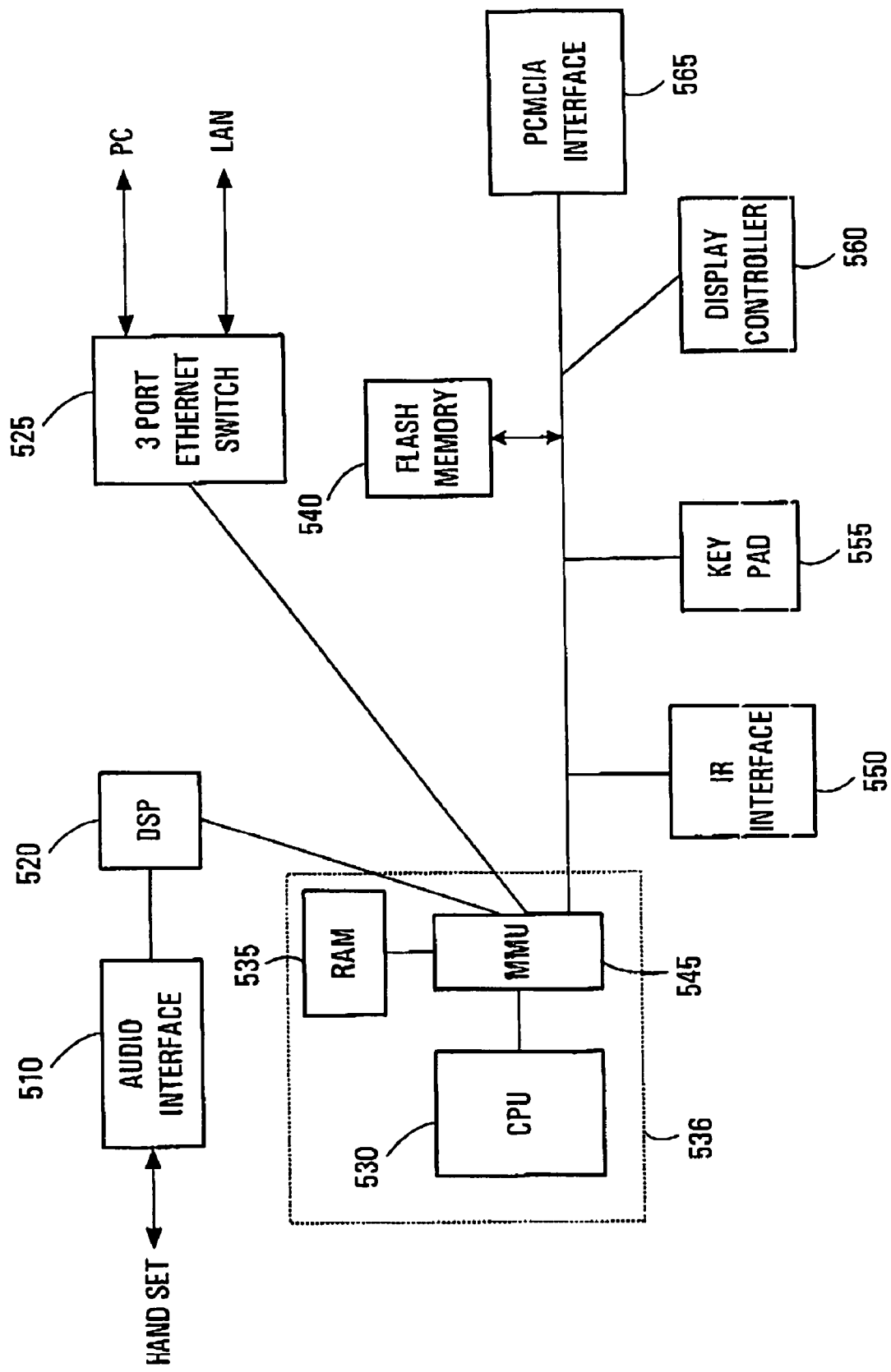
FIG. 2 is a partial circuit block diagram of a terminal set of the system of FIG. 1.

Referring to FIG. 2, shown is a partial circuit block diagram of terminal set 101 of FIG. 1. Terminal sets 102, 103, 104, 105 are similar to terminal seat 101 and have a circuit that can be equally represented by the partial circuit block diagram of FIG. 2. A CPU (Central Processor Unit) 530, a MMU (Memory Management Unit) 545 and a RAM (Random Access Memory) 535 form a processing device 536. The processing device 536 is connected to a Digital Signal Processing (DSP) 520 for encoding and decoding audio signals. The DSP 520 is connected to an audio interface 510. The processing device 536 is also connected to a 3-port switch 525 to allow connection to the LAN 30 and/or a PC (Personal Computer). The processing device 536 is also connected to a non-volatile flash memory 540, an IR (Infra-Red) interface 550, a Keypad and button interface 555, an LCD (Liquid Crystal Display) controller 560, and a PCMCIA (Personal Computer Memory Card International Association) Interface 565 to allow for standardized expansion of the terminal set 101. While a specific architecture is shown in FIG. 2, it is to be understood that the invention is not limited to the architecture shown in FIG. 2. More generally, in some implementations, a portion of or all of the functionality provided by the partial circuit block diagram of FIG. 2 is implemented on any network device, such as a terminal set, the TTI 40, and a PC (Personal Computer) for example. Preferably, the network device is a packet based telephone such as an VoIP (Voice over Internet Protocol) telephone terminal set. Other examples are video phone, PDA (Personal Digital Assistant), a soft phone, a wireless device or a wireless telephone that can be suitably programmed and configured to provide the distributed call transfer functionality described below. In some cases, the terminal sets are for example IP phones such as that manufactured by Mitel, Nortel, Avaya, Siemens, NEC, Pingtel or 3COM.

Figure 3:
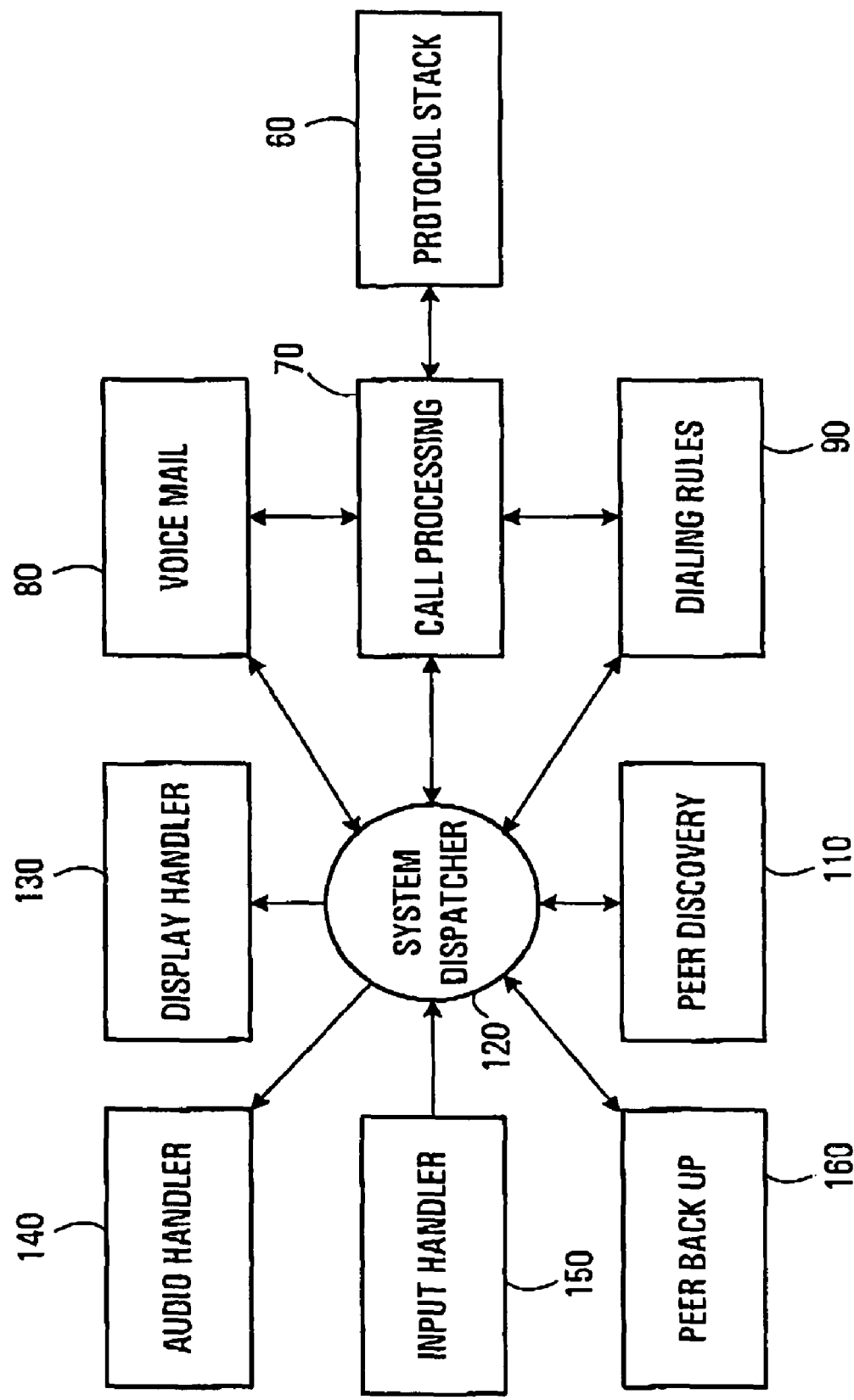
FIG. 3 is a functional block diagram of software operating on a terminal set of FIG. 1.

Referring to FIG. 3, shown is a functional block diagram of software operating on terminal set 101 of FIG. 1. The software will be described as operating on terminal set 101; however, it is to be understood that similar software is implemented in terminal sets 102, 103, 104, 105. Furthermore, in some cases, at least some of the features of the software described below are implemented in any network device such as the TTI 40 for example. The software is stored in RAM 535 of FIG. 2 and runs on the CPU 530. More generally, the software can be implemented as any suitable combination of instructions stored in memory for execution by general or special purpose processors, firmware, ASICs (Application Specific Integrated Circuits), FPGAs (Field-Programmable Gate Arrays), and general or special purpose logic. A system dispatcher 120 provides communication and scheduling between various functional elements which include a call processing module 70, a voice mail module 80, a dialing rules module 90, a peer discovery module 110, a display handler 130, an audio handler 140, an input handler 150, and a peer back-up module 160. The call processing module 70 also interfaces with a protocol stack 60.

FIG. 3 shows a detailed example of functions that may be included in a network device; however, it is to be understood that a network device need not have all of the functions shown in FIG. 3 and that in some implementations a network device will have only some of the functionality shown in FIG. 3. The display handler 130 formats information and displays the information to a user. The input handler 150 monitors inputs from for example key presses, hook switch, volume keys, and hands free and mute buttons and informs the system dispatcher 120. The system dispatcher 120 then distributes messages to other modules for further appropriate action to be taken. The audio handler 140 plays audio tones such as ringing, busy, and call waiting tones and/or connects to a handset speaker or speaker phone through a media call upon receipt of an audio message from the system dispatcher 120.

When terminal set 101 is initially connected to the network 30 it performs a peer discovery by executing the peer discovery module 110. At this point terminal set 101 undergoes a discovery of peer network devices such as terminal sets 102, 103, 104, 105 and TTI 40 by way of messages between terminal set 101 and terminal sets 102, 103, 104, 105 and TTI 40. Once the peer terminal sets are discovered, information is exchanged between the terminal set 101 and the peer network devices. At least part of the information exchanged in the messages is included in a routing table illustrated by way of example as shown in FIG. 5. The routing table is generally indicated by 200 and contains routing information for each of terminal sets 101, 102, 103, 104, 105 and TTI 40. A column 210 contains a DN (Directory Numbers) for each terminal 101, 102, 103, 104, 105. For example, in one case terminal sets 101, 102, 103, 104 have DNs 201, 202, 203, 204, 205 respectively. The DN uniquely identifies terminal sets 101, 102, 103, 104, 105 within the network 30. In the example implementation the TTI 40 is not a user dialable device. TTI 40 is given a different identifier T01 so that it can nonetheless be identified by other network devices. A column 220 has as entries a MAC (Media Access Control) address for each terminal set 101, 102, 103, 104, 105 and TTI 40. A column 230 has as entries an IP (Internet Protocol) address assigned to each terminal set 101, 102, 103, 104, 105 and TTI 40. A column 240 indicates a current device status of each terminal set 101, 102, 103, 104, 105 and TTI 40. For example, in one implementation a "1" indicates that a network device is up and running whereas a "0" indicates that the network device is un-available due to, for example, a failure.

In some implementations, a network device has one or more network devices designated to serve as backup network devices in the event the network device is unavailable to process a call. In particular, if a network device is unavailable to process a call, the call is re-directed to one of its designated backup network devices and the designated backup network device receiving the re-directed call provides call functionality for the network device that is unavailable. In the example of FIGS. 1 to 3, and 5 for each terminal set 101, 102, 103, 104, 105 there are two network devices designated as backup network devices which are identified in columns 260, 270 of the routing table 200. For example, network devices having DNs 202, 205 in columns 260, 270, respectively, are designated as backup network devices for terminal set 101 which has DN 201. In the example implementation, the TTI 40 (T01) is not backed up; however, as further discussed below in some implementations the TTI 40 is backed up by one or more network devices. As shown in the routing table 200, there are preferably two backup network devices designated for each network device; however, more generally, there is one or more backup network device designated for each network device. In our example implementation, in columns 260, 270 the backup network devices are identified by their DNs for clarity. Some implementations make use of DNs to identify backup network devices as illustrated. In other embodiments of the invention, MAC addresses are maintained in columns 260, 270 to identify the backup network devices. Furthermore, any unique identifier for the network devices may be used. The routing table 200 is shown as an illustrative example of the type of routing information that might be maintained; however, the invention is not limited to the illustrative example of FIG. 5 and in other implementations fewer or additional routing information is maintained in the routing table 200. More generally, the routing table 200 may contain any information on network devices, which is maintained for providing local functionality such as voice mail, call transfer, call forward, paging, and backup functionality. Other information that may also be maintained in table 200 might be for example, network device type identifiers, timestamps for synchronization purposes, network class identifiers for identifying a network class on which a network device is connected, and activity indicators identifying whether network devices are active. For purposes of providing backup functionality entries in columns 260, 270 are maintained. On a more simplified level, each network device maintains an identification of its designated backup network devices and an address for each designated backup network device. In particular, when a new network device is added to the network 30, the network device makes use of its peer discovery module 110 to obtain routing information pertaining to other network devices in the network 30 and makes use of the peer backup module 160 to designate two other network devices as backup network devices. In some implementations, maintaining column 260, 270 involves periodically redistributing backup designations to prevent, for example, a network device form continuously providing backup functionality for another network device that is prone to failure. Periodic redistribution of backup designations provides a fair distribution of workload in providing voice mail backup functionality among the network devices.

Referring back to FIG. 3, the dialing rules module 90 contains and/or applies a set of dialing rules for the call-processing module 70, which control how calls are directed. As an example of a dialing rule, a dialing rule might allow a terminal set to apply one or a set of filters to numbers dialed and if a match is found then the call is routed via a specific route to its destination.

The call-processing module 70 interacts with the protocol stack 60 to set up and tear down calls, and to set up media calls. When a call is received and a user is unable to answer the call because he or she is taking another call or because he or she is away from the terminal set, then the call may be optionally handled by the voice mail module 80.

The call processing modules of a number of network devices collectively serve to deliver PBX-like (Private Branch Exchange-like) call processing capabilities in a distributed fashion without the need for a PBX (Private Branch Exchange). For example, the call processing module 70 of terminal set 101 handles calls not only intended for terminal set 101 but also handles calls for other network devices for which it has been designated as a backup terminal set. This allows the voice mail module 80 to handle calls for the other network devices for which terminal set 101 has been designated as a backup terminal set. With reference to columns 210, 260 of the routing table 200, the network devices having DNs 202 and 205 both have designated as a first backup network device the network device having DN 201. As such, the network device having DN 201 provides voice mail functionality for calls not only intended for itself but also for calls intended for the network devices having DNs 202, 205. In particular, when the network device having DN 202 is unavailable, the network device having DN 201 will serve as a backup network device to provide call processing and/or voice mail functionality for calls intended for the network device having DN 202. Similarly, when network device having DN 205 is unavailable, the network device having DN 201 will serve as a backup network device to provide call processing and/or voice mail functionality for calls intended for the network device having DN 205.

Figure 4:
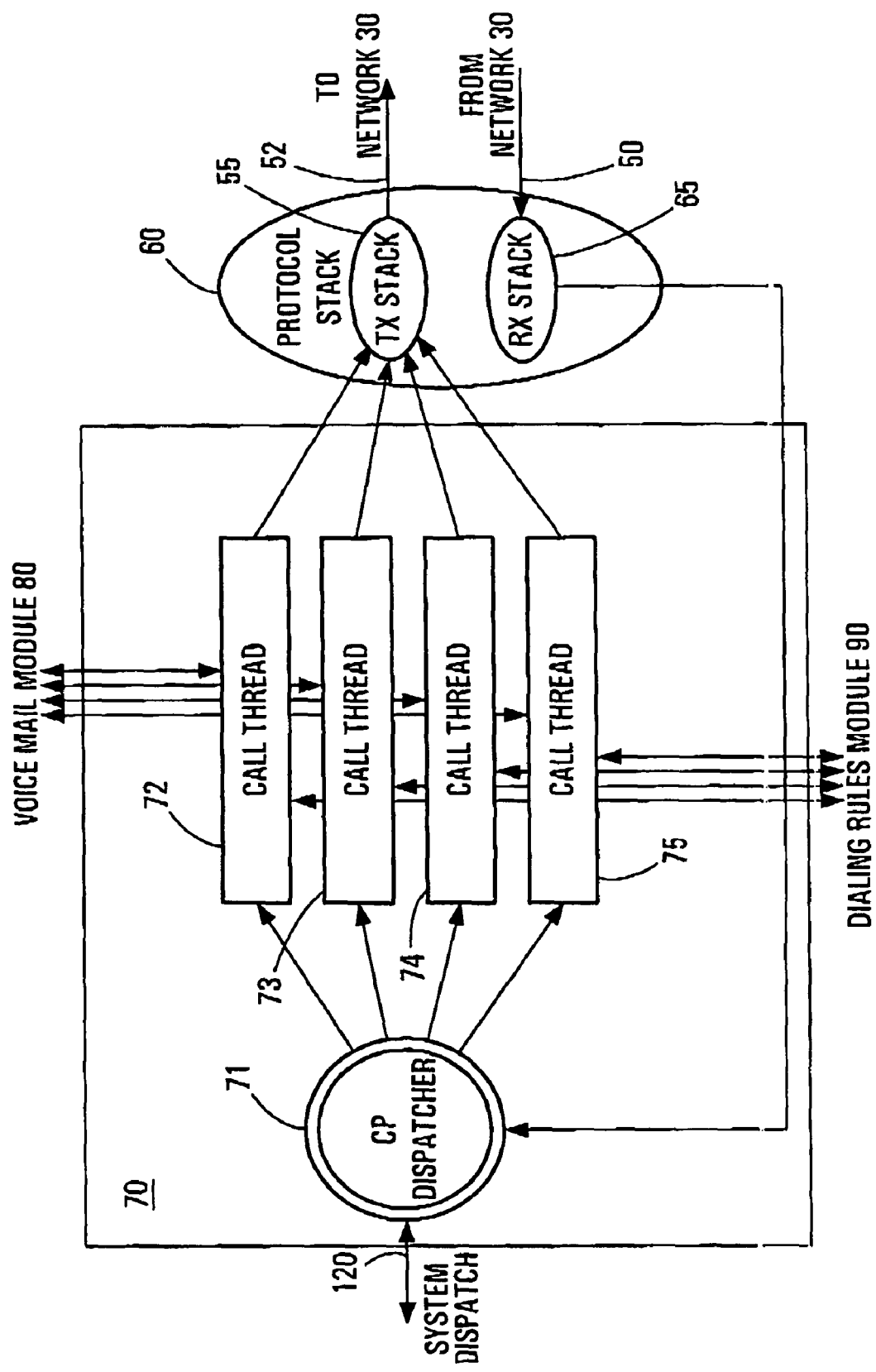
FIG. 4 is a functional block diagram of a call processing module of the software of FIG. 3.

An example implementation of the call processing module 70 together with the protocol stack 60 is shown in FIG. 4. In FIG. 4, the call processing module 70 has four call threads 72, 73, 74, 75 and a CP (Call Processor) dispatcher 71. The protocol stack 60 has a Tx (Transmit) stack 55 and an Rx (Receive) stack 65. Incoming calls are queued in the Rx stack 65 and outgoing calls are queued in the Tx stack 55. A channel 50 provides a connection to the network 30 for the incoming calls and a channel 52 provides a connection to the network 30 for the outgoing calls. The incoming and outgoing calls may be for example in the form of messages that are for example requests, responses to request, messages containing information such as routing information for other network device, messages containing information such as routing information from other network devices, and messages containing media information. The requests may be for example, requests for establishing connections, requests for terminating connections, or media data such as voice.

Each of the call threads 72, 73, 74, 75 is capable of handling a respective call. For example, a media call received by the terminal set 101 may be processed by the call thread 72, while a voice mail message may be recorded simultaneously on call thread 73. In addition, the call thread 74 might at the same time be involved in recording a voice mail message intended for another network device for which terminal set 101 is designated as a backup. The CP dispatcher 71 manages the call threads 72, 73, 74, 75 and performs scheduling of incoming and outgoing calls. In addition, the four call threads 72, 73, 74, 75 provide a mechanism for simultaneously handling 3-way conferencing plus voice mail. The invention is not limited to four call threads and in other implementations, there are two or more call threads. In some implementations in which there are two call threads, the two call threads might be used to simultaneously handle an incoming call and another call intended for voice mail, paging, or call forwarding example.

When an incoming message for a call arrives at the protocol stack 60 through channel 50, the incoming message is queued in the Rx stack 65 and then sent to the CP Dispatcher 71. The CP dispatcher 71 determines the thread 72, 73, 74, 75 to which the call is to be sent and forwards the message to the determined thread. Each call thread 72, 73, 74, 75 is capable of interfacing with the voice mail module 80, the dialing rules module 90, the peer discovery module 110, the display handler 130, the audio handler 140, the input handler 150, and the peer backup module 160. The call threads 72, 73, 74, 75 are shown interfacing with the voice mail module 80, the dialing rules module 90, and the CP dispatcher 71 only for purposes of clarity. The module or modules that a call thread interfaces with depends on the type of message being received or made. For example, if the message is intended for voice mail, the voice mail module 80 interfaces with the call thread. In response to the received message one of the call threads 72, 73, 74, 75 interfacing with one or more of the modules if necessary and generates a response message to the Tx stack 55 of the protocol stack 60 to be packaged and sent to a destination network device. The message contains information provided by one or more of the modules 80, 90, 110, 130, 140, 150, 160. The type of message being sent back to the network 30 depends on the state of the call thread. If, for example, the call received corresponds to an INVITE message for initiating a new call under a SIP (Session Initiation Protocol) then the response is an appropriate acknowledgement such as a RINGING message indicating that the terminal set is ringing or an OK message indicating that the call has been answered.

Figure 6:
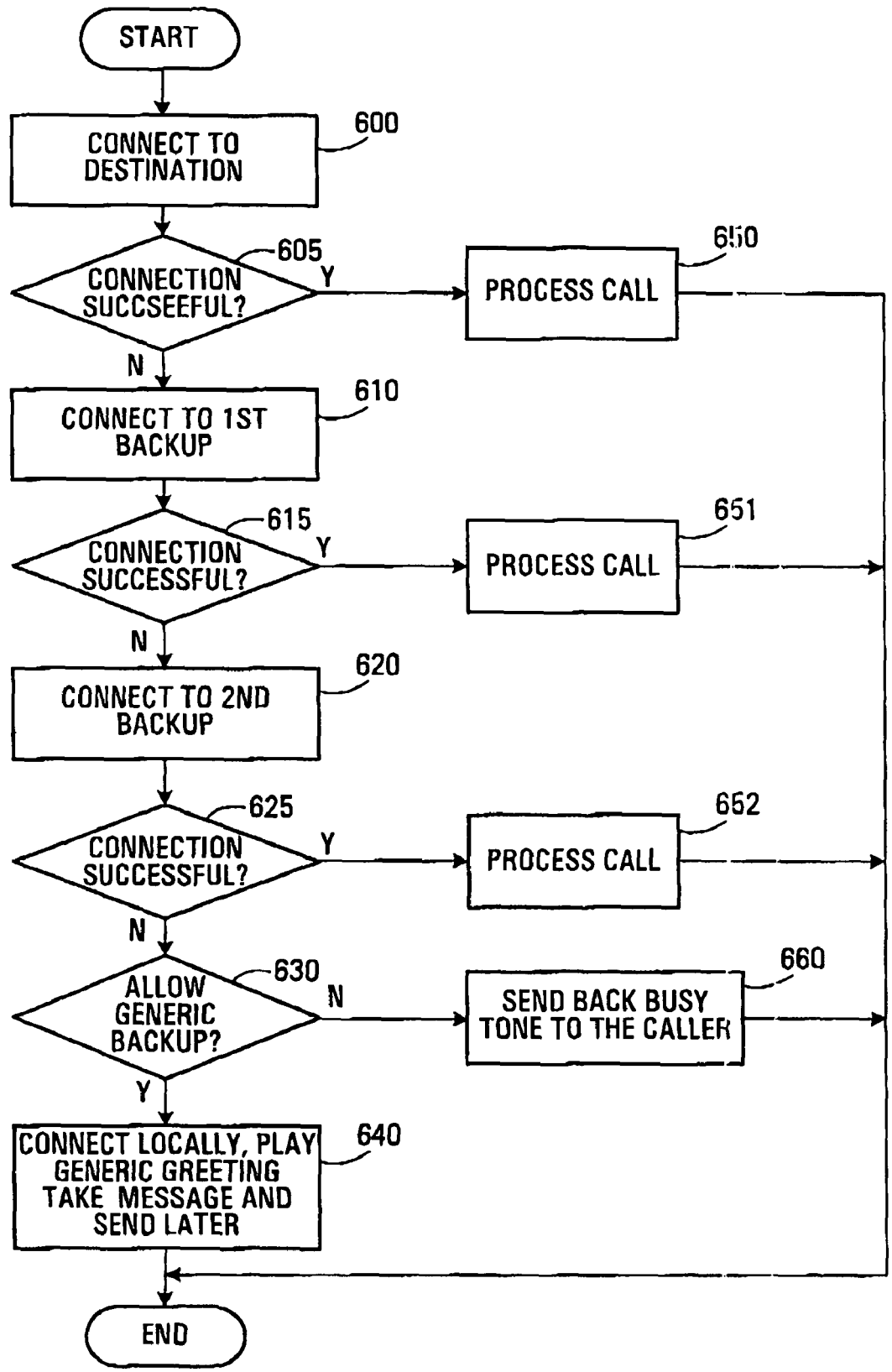
FIG. 6 is a flow chart of a method of initiating a call from one network device to another network device which might for example be employed in the system of FIG. 1.

Referring to FIG. 6, shown is a flow chart of a method of initiating a call from one network device to another network device which might for example be employed in the system 10 of FIG. 1. In particular, a caller at an originator network device wishes to call a person at a destination network device. At step 600, the originator network device attempts to establish a connection for a call with the destination network device. At step 605, if the connection is established the call is processed (step 650). The attempt may be unsuccessful due to for example one or more of a network failure, failure at the destination network device, the destination network device being unplugged and lack of resources at the destination network device to process a call. In some cases, the lack of resources might be due to for example all call threads at the destination network device being used simultaneously. At step 605 if the attempt is unsuccessful, then the originator network device looks up its routing information to determine which network device is to serve as a first backup network device for the destination network device and to determine an address for the first backup network device. The originator network device then initiates a call to the first backup network device by attempting to establish a connection using the address of the first backup network device (step 610). At step 615, if the attempt is successful and a connection is established with the first backup network device, the call is processed (step 651). Again, the attempt at the connection with the first backup network device may be unsuccessful and at step 615, if the attempt of step 610 fails, then the originator network device looks up its routing information to determine which network device is to serve as a second backup network device for the destination network device and to determine an address for the second backup network device. The originator network device then initiates a call to the second backup network device by attempting to establish a connection using the address of the second backup network device (step 620). At step 625, if the attempt is successful and a connection is established with the second backup network device, the call is processed (step 652). The originator network device has a generic call processing capability that allows the originator network device to take the call locally and provide voice mail functionality locally using a generic greeting. In particular, there is a user option for enabling the generic call processing capability. At step 625, if the attempt of step 620 is unsuccessful, a determination of whether the generic call processing capability is enabled is determined (step 630). At step 630, if the generic call processing capability is enabled a connection is established locally, a generic voice mail greeting is played and a voice mail message from the caller initiating the call is recorded and later sent to the destination network device when the destination network device becomes available (step 640). At step 630, if the generic voice mail functionality is disabled a busy tone is played to the caller (step 660).

In the example of FIG. 6, it is assumed that for steps 600, 610, 620 the destination network device, the first backup network device, and the second backup network device, respectively, are active before a connection is attempted; however, in some implementations at the steps 600, 610, 620 a look-up in column 240 of the routing table 200 is performed to first determine whether a network device for which a connection is to be established is active. An attempt at a connection is then performed only if the network device is active.

Regarding processing at the destination network device, in one implementation at step 650 the call is processed with a ringing signal being generated for answering of the call by a user at the destination network device and only after a predetermined number of ring is a voice mail message taken. However, at steps 651, 652, 640, the call is directly processed by a call processing thread in cooperation with the voice mail module of the network device answering the call, whether it be a designated backup network device (step 651 or 652) or the originator network device (step 640).

Whether it be the destination network device (step 650), or one of the designated backup network devices (step 651 or 652), or the originator network device (step 640), the network device that accepts the call preferably does so in a manner that is unique to the original destination telephone set. This might for example involve having each network device maintain its own specific voice mail greeting and other greetings specific to the network devices the designated as backup network devices. Furthermore, in some implementations, each network device maintains user options for handling voice mail and call forwarding.

In the method of FIG. 6, each network device is assigned two other network devices as backup network devices and as such there are up to two attempts at establishing connections with network devices designated as backup network devices (steps 610, 620). More generally, a network device has M other network devices designated as backup network devices with M≧1 and successive attempts at establishing connections with the M backup network devices are performed until one of the attempts is successful. Again, in some implementations the status of a network device is first looked-up and an attempt at a connection with the network device is performed only if the status indicates that the network device is active. As such in some cases, there are 0≦N≦M attempts at establishing connections with backup network devices. If none of the attempts are successful then the call is handled locally as described with reference to steps 630, 640, 660.

Furthermore, in some implementations, there is no generic call processing capability as described with reference to step 640 in which case when the attempt at step 625 is unsuccessful, the caller is provided with a busy tone (step 660).

In the example implementation of FIGS. 1 to 6, the TTI 40 is not backed up by another network device; however, in some implementation the TTI 40 is backed up by one or more other network devices. In some embodiments of the invention each network device is backed up by one or more network devices. Preferably, for each network device one or more network devices of the same type are designated as backup network devices. For example, in some embodiments of the invention a telephone terminal set has one or more other telephone terminal sets designated as backups and a TTI has one or more other TTIs designated as backups.

The method of FIG. 6 will now be described for a specific example in which a user at terminal set 101 of FIG. 1 attempts to make a call to terminal set 103. In this specific example terminal sets 101 and 103 correspond to the originator and destination network devices, respectively. In the specific example terminal sets 101, 102, 103, 104, 105 have DNs 201, 202, 203, 204, 205, respectively. As shown in columns 210, 260, 270 of the routing table 200, the network devices having DNs 202, 204 (terminal sets 102 and 104) are designated as backup network devices for the network device having DN 203 (the destination network device corresponding to terminal set 103). At step 600 terminal set 101 attempts to establish a connection for a call with terminal set 103. At step 605, if the connection is established the call is processed by terminal set 103 (step 650). At step 605 if the attempt is unsuccessful, then the terminal set 101 looks up its routing table 200 to determine from column 260 that terminal set 102 (DN 202) is to serve as a first backup terminal set for terminal 103 (DN 203) and determines from column 220 or 230 an address for terminal set 102. In some implementations, the call processing module 70 is responsible for retrieving the address of the first backup network device and for providing instructions for connecting to the first backup network device. The terminal set 101 then initiates a call to the terminal set 102 by attempting to establish a connection using the address of terminal set 102 (step 610). At step 615, if the attempt of step 610 is successful and a connection is established with terminal set 102, the call is processed by terminal set 102 (step 651). At step 615, if the attempt of step 610 fails, then terminal set 101 looks up its routing table 200 to determine from column 270 that terminal set 104 (DN 204) is to serve as a second backup terminal set for terminal set 103 (DN 203) and to determine from column 220 or 230 an address for the terminal set 104. The terminal set 101 then initiates a call to terminal set 104 by attempting to establish a connection using the address of terminal set 104 (step 620). At step 625, if the attempt is successful and a connection is established with terminal set 104, the call is processed by terminal set 104 (step 652). At step 625, if the attempt of step 620 is unsuccessful, a determination of whether the generic call processing capability is enabled is determined (step 630). At step 630, if the generic call processing capability is enabled a connection is established locally, a generic voice mail greeting is played and a voice mail message from the caller initiating the call at terminal set 101 is recorded and later sent to terminal set 103 when terminal set 103 becomes available (step 640). At step 630, if the generic voice mail functionality is disabled a error tone such as a fast busy is played to the caller at terminal set 101 (step 660).

The method of FIG. 6 describes how a network device attempts to establish a call and in some cases the call is answered by way of voice mail. The manner in which a network device participates in the transfer of a call using local call transfer functionality will now be described.

Call Transfer

By way of introduction, in most systems there are two types of call transfers, known as blind and consultation transfers. A transfer sequence requires a user to initiate a transfer using any suitable method such as pressing a transfer key on a network device for example. The call is then placed on hold and a dial tone is provided to the user making the transfer. The user making the transfer then dials the desired extension and waits for ringing. In a blind transfer the user transferring the call completes the transfer, for example, by pressing a transfer key or hanging up immediately after ringing starts, whereas in a consultation transfer the user making the transfer waits for a connection with the network device at a new destination to be established before completing the transfer. During a blind transfer, the network device of the user making the transfer monitors whether a user at the new destination network device answers the call. If a user at the new destination network device does not answer the call after a specified period then the call is returned to the network device of the user making the transfer.

Figure 7:
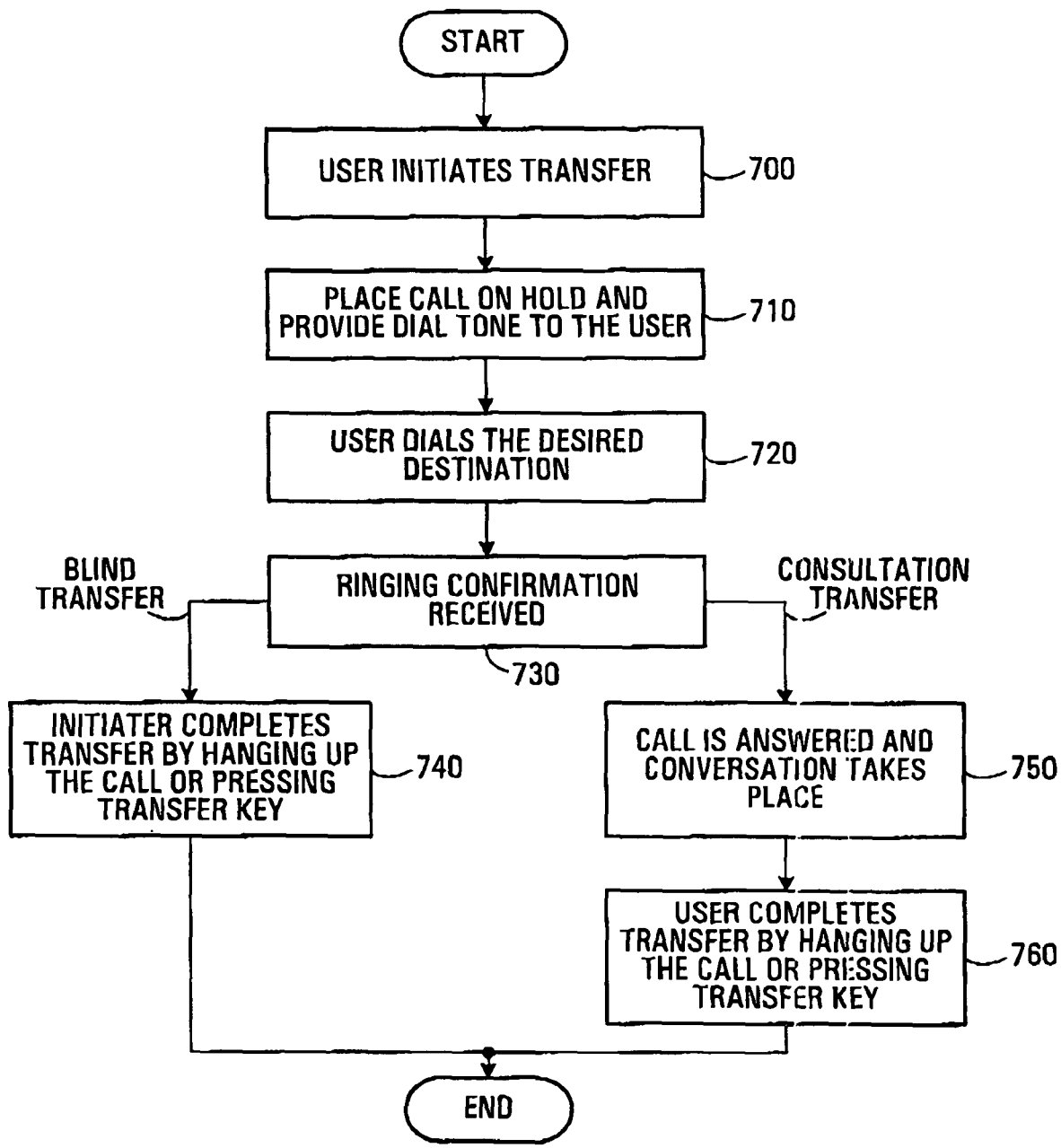
FIG. 7 is a flow chart of steps followed in transferring a call.

Referring to FIG. 7, shown is a flow chart of steps followed in transferring a call. At step 700, a user initiates a transfer of a call from an originator network device by pressing a transfer key for example. At step 710, the call is placed on hold and a dial tone is provided to the user making the transfer. The user then dials a new destination (transferee) for transferring the call (step 720) and then receives a ringing confirmation from the new destination (step 730). In the case of a blind transfer, the user initiates the transfer by hanging up the call to the new destination or by pressing a transfer key (step 740). In the case of a consultation transfer, the call to the new destination is answered and a conversation takes place (step 750). The user making the transfer then completes the transfer by hanging up the call to the new destination or by pressing the transfer key (step 760).

Embodiments of the invention provide a call transfer system, methods, and network devices for transferring a call between an originator network device and another network device to a destination network device without the involvement of a switch or central processing.

A first embodiment of the invention provides a network device adapted to locally deliver call transfer functionality. Of course, it takes multiple network devices to actually complete a transfer. There is the original calling network device, the original recipient of the call, and the transferee.

A given network device should be able to function in the capacity of any of these three roles, namely originator, original recipient, and transferee, and a call transfer function is designed to allow this. However, in some embodiments some network devices will only be capable of one or more of the roles.

As discussed above, it takes multiple network devices to actually complete a transfer, namely the original calling network device, the original recipient of the call, and the transferee. A call transfer according to an embodiment of the invention will now be described with reference to FIGS. 8 and 10.

Figure 8:
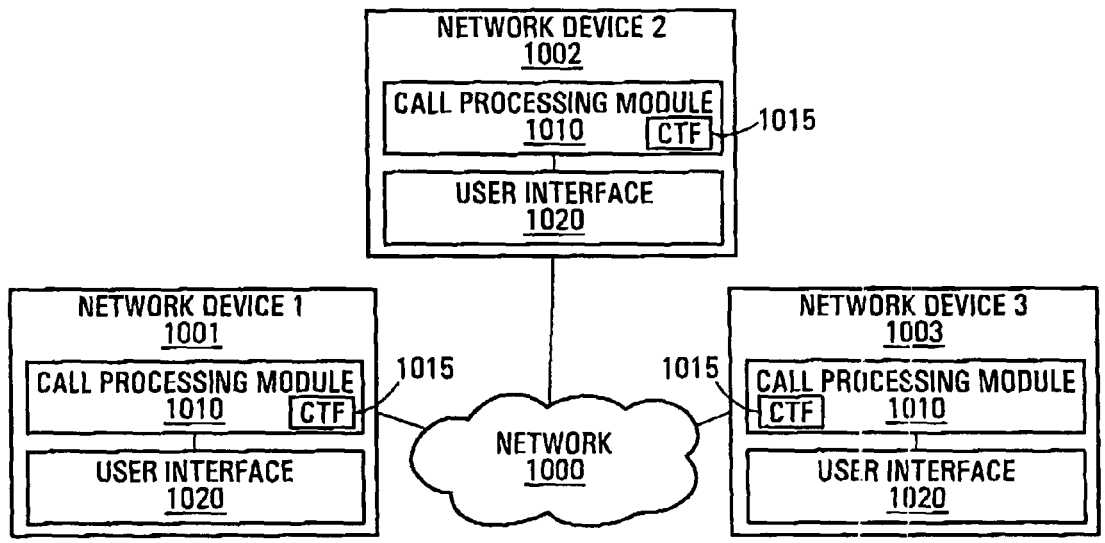
FIG. 8 is a basic block diagram of a distributed peer-to-peer network.

Referring to FIG. 8 shown is a basic block diagram of a distributed peer-to-peer network. In FIG. 8 shown are first, second, and third network devices 1001, 1002, 1003 on a network 1000. Each network device 1001, 1002, 1003 has a call processing module 1010 having a CTF (Call Transfer Function) 1015, and a user interface 1020. The call processing module 1010 of the network devises 1001, 1002, 1003 is adapted to process calls using the CTF 1015 to provide local call transfer functionality. In some embodiments of the invention, the call processing functionality of the call processing module described above with reference to FIGS. 1 to 6 is implemented in the call processing modules 1010; however, it is to be clearly understood that in other embodiments only some of the call processing features described above are implemented and other call processing feature may also be implemented. The user interface is adapted to receive a user input requesting a call transfer to another network device. In FIG. 8, the CTF 1015 is implemented as part of the call processing module 1010; however, the invention is not limited to the CTF 1015 being implemented as part of the call processing module 1010 and in some embodiments of the invention the CTF is distinct from the call processing modules. In the description that follows, it is assumed that the CTF 1015 is implemented as part of the call processing module 1010. Furthermore, the CTF 1015 is implemented in any suitable way including software, hardware, or firmware for example.

Each network device may be for example a terminal set, a packet based telephone, a VoIP (Voice over Internet Protocol) telephone, a video phone, a PC (Personal Computer), a PDA (Personal Digital Assistant), a soft phone, a wireless device, or a wireless telephone suitably programmed and configured to provide call transfer functionality.

For each network device 1001, 1002, 1003 the call processing module 1010 provides call transfer functionality as one or more of an original calling network device, an original recipient of a call to be transferred, and a transferee of a call using the CTF 1015. As an original recipient of a call the call processing module 1010 interfaces with the user interface 1020 of the network device to obtain a user input from a user at the network device initiating transfer of a call.

Figure 10:
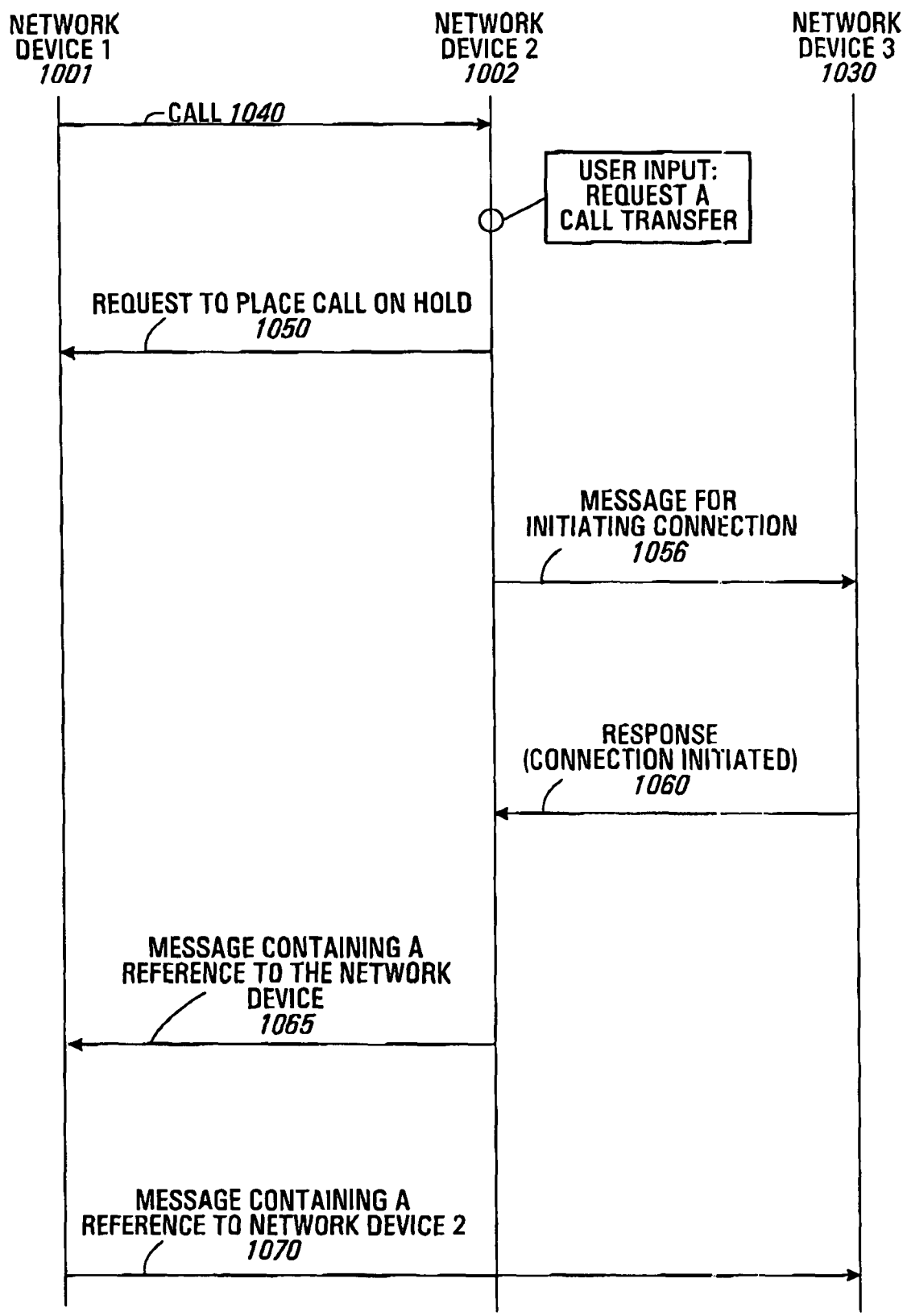
FIG. 10 is a signal flow diagram for call transfer, according to an embodiment of the invention.

Referring now to FIG. 10, shown are the basic steps that take place in a call transfer scenario. As an illustrative example of a particular scenario, a call originates from the first network device 1001 and is answered at the second network device 1002. The call is then transferred to the third network device 1003. However, it is to be understood that there are other possible scenarios. More generally, a call might originate from any one of network devices 1001, 1002, 1003; answered by any first other one of network devices 1001, 1002, 1003 and transferred to a second other one of network devices 1001, 1002, 1003. Furthermore, in FIG. 10 a user input is received at an original recipient of the call 1040 which happens to be the second network device 1002 in this case; however, the invention is not limited to such a case. In other cases a call transfer is initiated at an originator of a call corresponding to the first network device 1001 for example.

Firstly, a user at the first network device 1001 decides to initiate a call to a user at the second network device 1002 and a call 1040 is established between the first network device 1001 and the second network device 1002. The user at network device 1002 initiates a transfer of the call by way of an input at the user interface 1020 of the second network device 1002. Upon receipt of the user input, the call processing module 1020 of the second network device 1002 sends a message 1050 to the first network device 1001 requesting that the call be placed on hold. Note that in some implementations there is no message 1050 being sent to the first network device 1001 and the second network device 1002 places the call on hold without sending message 1050. After requesting that the call be placed on hold, the second network device 1002 initiates a connection with the third network device 1003 by sending a message 1055 to the third network device 1003. The third network device 2003 responds to the message 1055 from the second network device 1002 with a response 1060 indicating that the connection has been initiated. Upon receipt of the response 1060 from the third network device, the call processing module 1010 of the second network device 1002 sends a message 1065 to the first network device 1001 containing a reference to network device to the third network device 1003. In some embodiments of the invention, the message 1065 also contains a reference to the connection between the second and third network devices 1002, 1003. The first network device 1001 responds to the message 1065 from the second network device 1002 by sending a message 1070 to the third other network device 1003 containing a reference to the second network device 1002 so as to initiate setting up a connection between the first network device 1001 and the third network devices 1003. In some embodiments of the invention, the message 1070 also contains a reference to the connection between the second network device 1002 and the third network device 1003. The third network device 1003 then replaces the connection between the second and third network devices 1002, 1003 with another connection between the first and third network devices 1001, 1003. A connection might be considered for example as a session between two network devices which may or may not include audio. Furthermore, in some embodiments of the invention, there is no response 1060 being sent. In addition, the request 1050 can be any suitable message. In some embodiments of the invention, there is no message 1070 being send and the first and third network device, 1001 1003 establish a media path with each other using default settings for example.

Another embodiment provides a system in a network having a plurality of network devices on the network, each being adapted to perform local call transfer as described above with reference to FIGS. 8 and 10. Each network device is preferably one of the above summarized network devices.

In yet another embodiment, the system also has at least one TTI connected to the network with the TTI having at least some call transfer functionality. In this embodiment, for transfers to and from external network devices outside the network, the TTI is adapted to provide local call transfer functionality as a transferee or an originator, respectively, for the network devices outside the network 1000.

Figure 9:
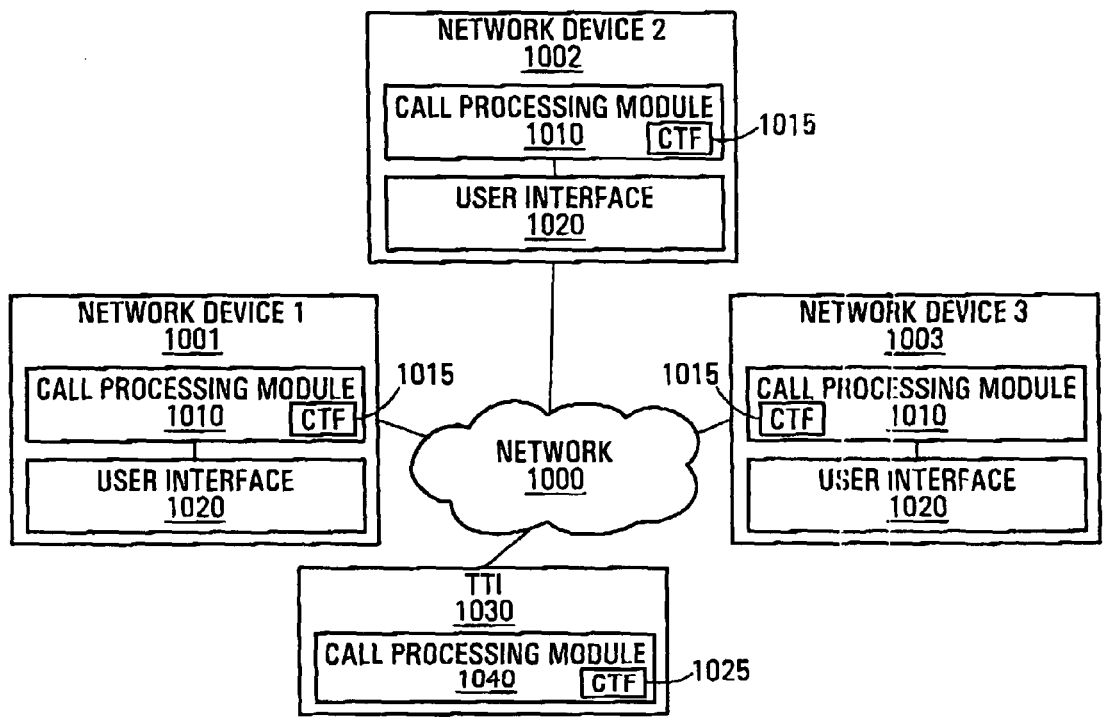
FIG. 9 is another basic block diagram of a distributed peer-to-peer network.
Figure 11A:
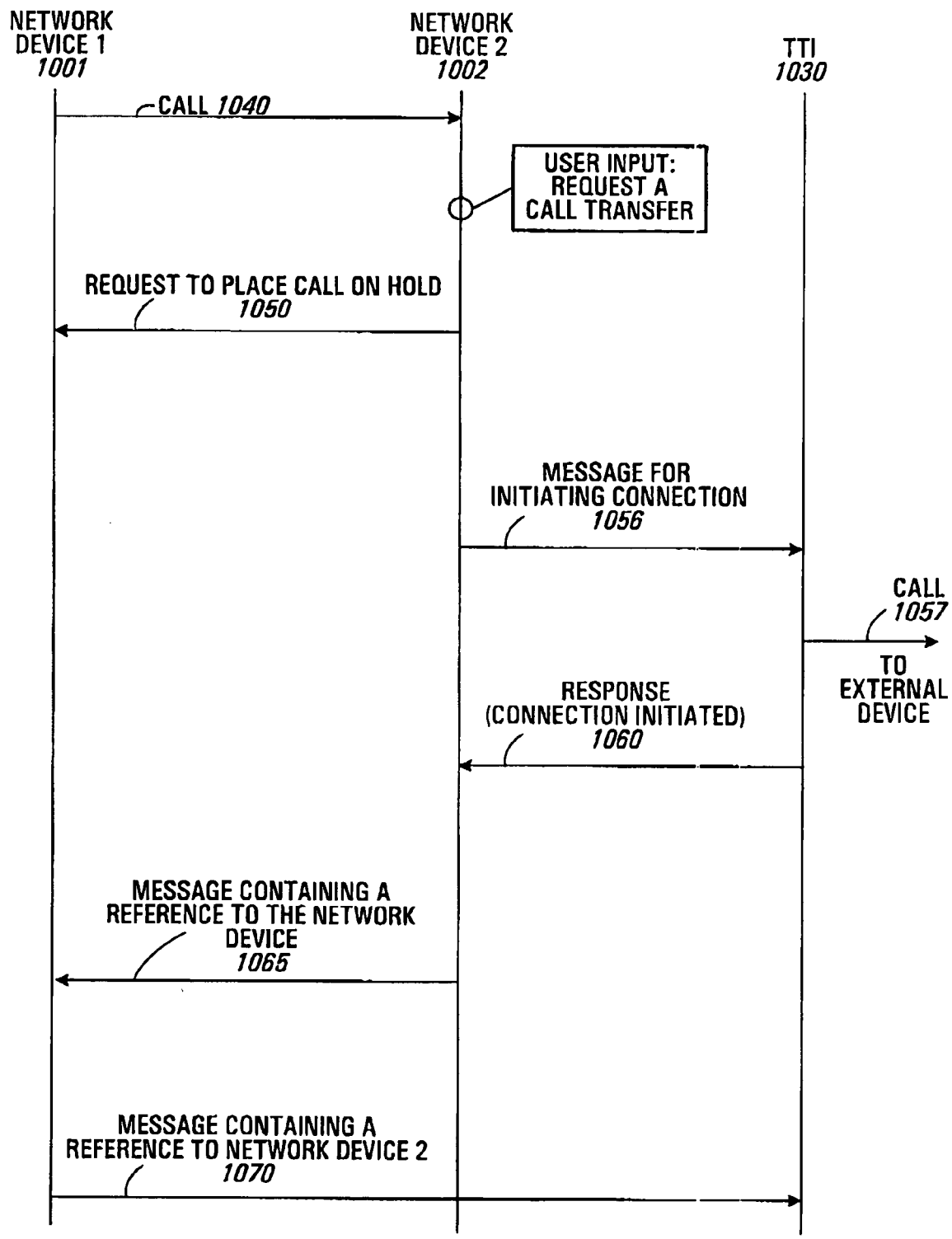
FIG. 11A is a signal flow diagram for call transfer, according to another embodiment of the intention.

An example of this is shown in FIG. 9, where a TTI 1030 is shown having a call processing module 1040, which is connected to the network 1000. The call processing module 1040 is capable of directing calls between the network devices 1001, 1002, 1003 and external network devices (not shown) outside the network 1000. Furthermore, the call processing module 1040 of the TTI 1030 has a CTF 1025 that participates in transfers of calls to and from the external network devices by providing local call transfer functionality as a transferee or an originator, respectively, for the external network devices outside the network. For example, in FIG. 11A a signaling sequence similar to that of FIG. 10 is shown except that the third network device 1003 of FIG. 10 is replaced with the TTI 1030. In particular, in this case the TTI 1030 provides call transfer functionality as a transferee of the call 1040 for an external device (not shown) external to the network 1000. Upon initiation of the transfer of the call 1040 at the second network device 1002 to the external network device outside the network 1000, the TTI 1030 receives a message 1056 containing a reference to the external network device from the second network device 1002 for initiating a connection between the second network device 1002 and the external network device. The TTI 1030 initiates a call 1057 to the external network device. Alternatively, depending on a gateway mechanism used by the TTI 1030 relays a call associated with the message 1056 to the external network device. The TTI 1030 also provides a response 1060 to the second network device 1002 indicating that the connection has been initiated. Note that in some implementations the call 1057 is initiated after the response 1060 is sent to the second network device 1002. Upon receipt of a message from the first network device 1001 with the message containing a reference to the second network device 1002, the call processing module 1040 of TTI 1030 replaces the connection with the second network device 1002 with a connection between the first network device 1001 and the TTI 1030 (not shown). Depending on the gateway mechanism used by the TTI 1030, the TTI 1030 also relays the call associated with the replaced connection to the external network device or initiates a new connection with the external network device.

Figure 11B:
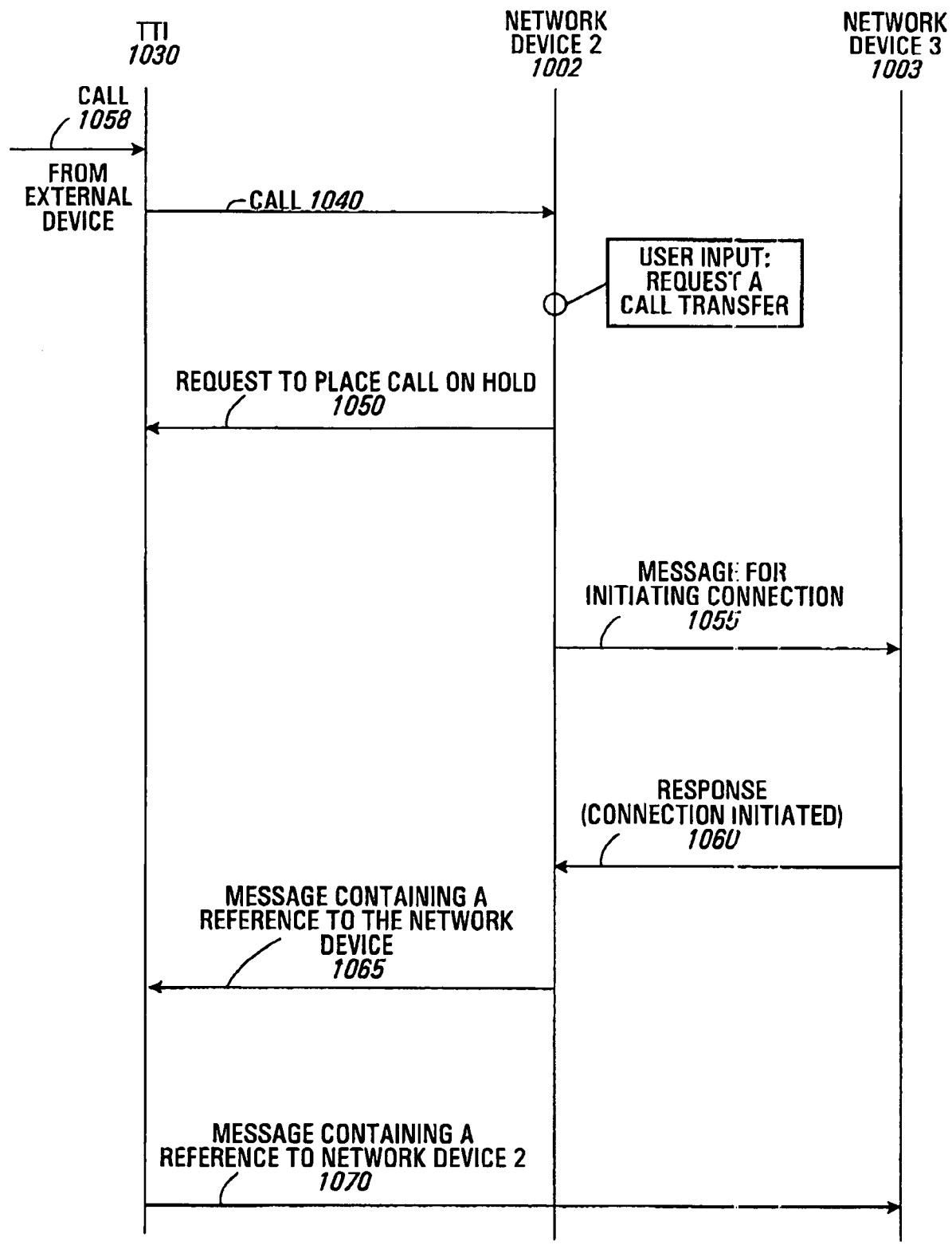
FIG. 11B is a signal flow diagram for call transfer, according to another embodiment of the invention.

In another example, a call transfer of a call from an external network device outside the network 1000 to the second network device 1002 is initiated at the second network device 1002 for transfer to the third network device 1003. In such a case, the call processing module 1040 of the TTI 1030 follows the same messaging sequence followed by the first network device 1001 as shown in FIG. 10 except that a call is received by the TTI 1030 from an external network device. This is shown in FIG. 11B where the first network device 1001 is replaced by the TTI 1030. A call 1050 from an external network device external to the network 1000 is received by the TTI 1030. Depending on the gateway mechanism used by the TTI 1030, the TTI 1030 relays the call 1058 as call 1040 to the second network device 1002 or call 1040 is initiated as a new call. The TTI 1030 then follows the same messaging sequence as the first network device 1001 of FIG. 10.

In FIGS. 8 and 9 there are three network devices 1001, 1002, 1003; however, in other embodiments of the invention any appropriate number of network devices can be employed. Furthermore, in FIG. 9 there is only one TTI 1030; however, in other embodiments of the invention any appropriate number of TTIs can be employed.

Example implementations for both blind and consultation transfers will now be described with reference to FIGS. 12 to 15. In the example implementations messaging between network devices is implemented using the SIP (Session Initiation Protocol) standard; however, it is to be understood that the invention is not limited to implementation using the SIP Standard. For example, in some implementations the H. 323 (packet based communication system standard communication system) standard is used. Furthermore, in FIGS. 12 to 15, call transfer is applied to network devices 1001, 1002, 1003; however, the call transfer functionality is also equally applicable to any network device such as terminal sets 101, 102, 103, 104, 105 of FIG. 1 for example capable of providing local call transfer as described with reference to FIGS. 8 to 10.

A detailed example implementation of a blind transfer embodiment in a distributed peer-to-peer network will now be described with reference to FIG. 12, as provided by an embodiment of the invention. In the example, the first network device 1001 (originator) calls the second terminal set 1002 by sending an INVITE message 1100. The second network device 1002 processes the INVITE message 1100 and responds with a RINGING signal 1110 followed by an OK message 1120 when a user at the second network device 1002 answers the call. The first network device 1001 acknowledges the OK message 1120 with an ACK (ACKnowledge) message 1130, which is sent to the second network device 1002. A media path 1140 is then established between the first and second network devices 1001, 1002, and users at the first and second network devices 1001, 1002 may converse. The user at the second network device 1002 wishes to transfer the call to the third network device 1003 and initiates the transfer by pressing a transfer key on the second network device 1002. The call between the first and second network devices 1001, 1002 is placed on hold and the user at the second network device 1002 is provided with a dial tone. To place the call on hold, an INVITE message 1150 is sent to the first network device 1001. Part of the INVITE message 1150 includes information to disable media communication. The INVITE message 1150 is confirmed with an OK message 1160. The user at the second network device 1002 enters a desired destination and the second network device 1002 performs a translation to an IP address of a number dialed by the user at the second network device 1002 using the routing table 200 of FIG. 5 and initiates a connection by sending a INVITE message 1170 to the third network device 1003. The third network device 1003 responds to the second network device 1002 with a RINGING message 1180. Upon receiving the RINGING message 1180 at the second network device 1002 a ringing tone is played to the user at the second network device 1002 via a handset (or speaker phone). The user at the second network device 1002 hangs up the call to complete the blind transfer. The second network device 1002 then initiates a REFER request 1190 to the first network device 1001 with a reference to the third network device 1003 as the new destination and with a call ID (IDentifier) of the call between the second and third network devices 1002, 1003. In some implementations, the reference is an IP address, a port number or a DN, or any combination thereof for example. The first network (device 1001 accepts the REFER request 1190 and responds with an ACCEPTED message 1105 to indicate that the REFER request 1190 has been understood. The first network device 1001 then sends an INVITE message 1115 to the third network device 1003 with the INVITE message 1115 containing a reference to the call between the second network device 1002 and the third network device 1003 to replace the call between the second and third network devices 1002, 1003 with a call between the first and second network devices 1001, 1002. The third network device 1003 receives the INVITE message 1115 and locates the call from the second network device 1002 based on the call ID and switches its internal state, by switching for example a media channel address and ports, to point to the first network device 1001. The third network device 1003 responds with a RINGING message 1125 if a current call state is RINGING. When a user at the third network device 1003 answers the call, an OK message 1135 is sent to the first network device 1001. The first network device 1001 acknowledges the receipt of the OK message 1135 with an ACK message 1145, which is sent to the third network device 1003. A media path 1155 between the first and third network devices 1001, 1003 is then established. Finally, a NOTIFY message 1165 is sent to the second network device 1002 to complete the REFER request 1190 and to indicate to the second network device 1002 that the REFER request 1190 was successful and completed. The second network device 1002 then responds with an OK message 1175, terminates the call with the first network device 1001 and performs any house cleaning as required.

Figure 12:
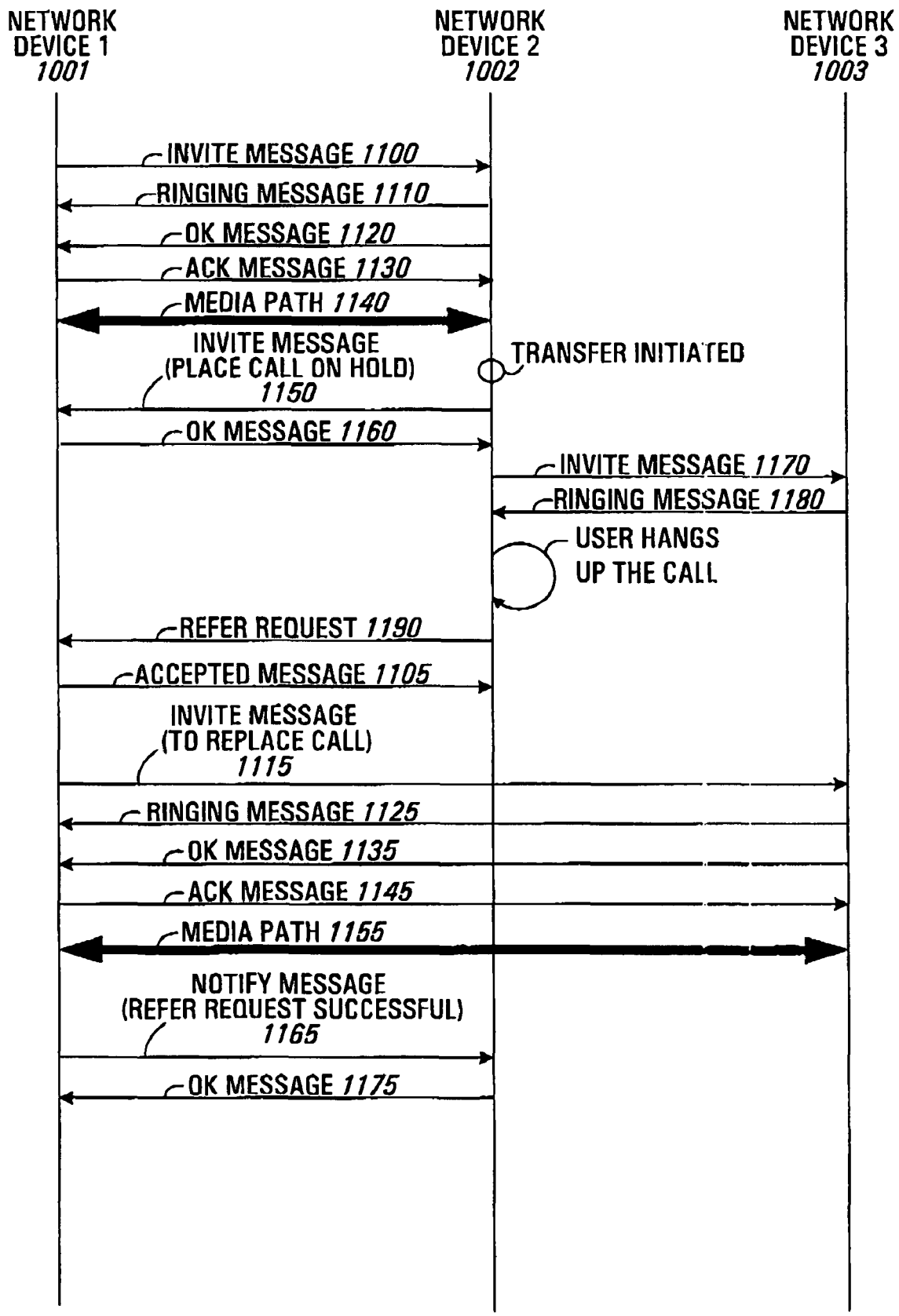
FIG. 12 is a signal flow diagram of an example implementation of a blind transfer of a call in a distributed peer-to-peer network, according to another embodiment of the invention.
Figure 13:
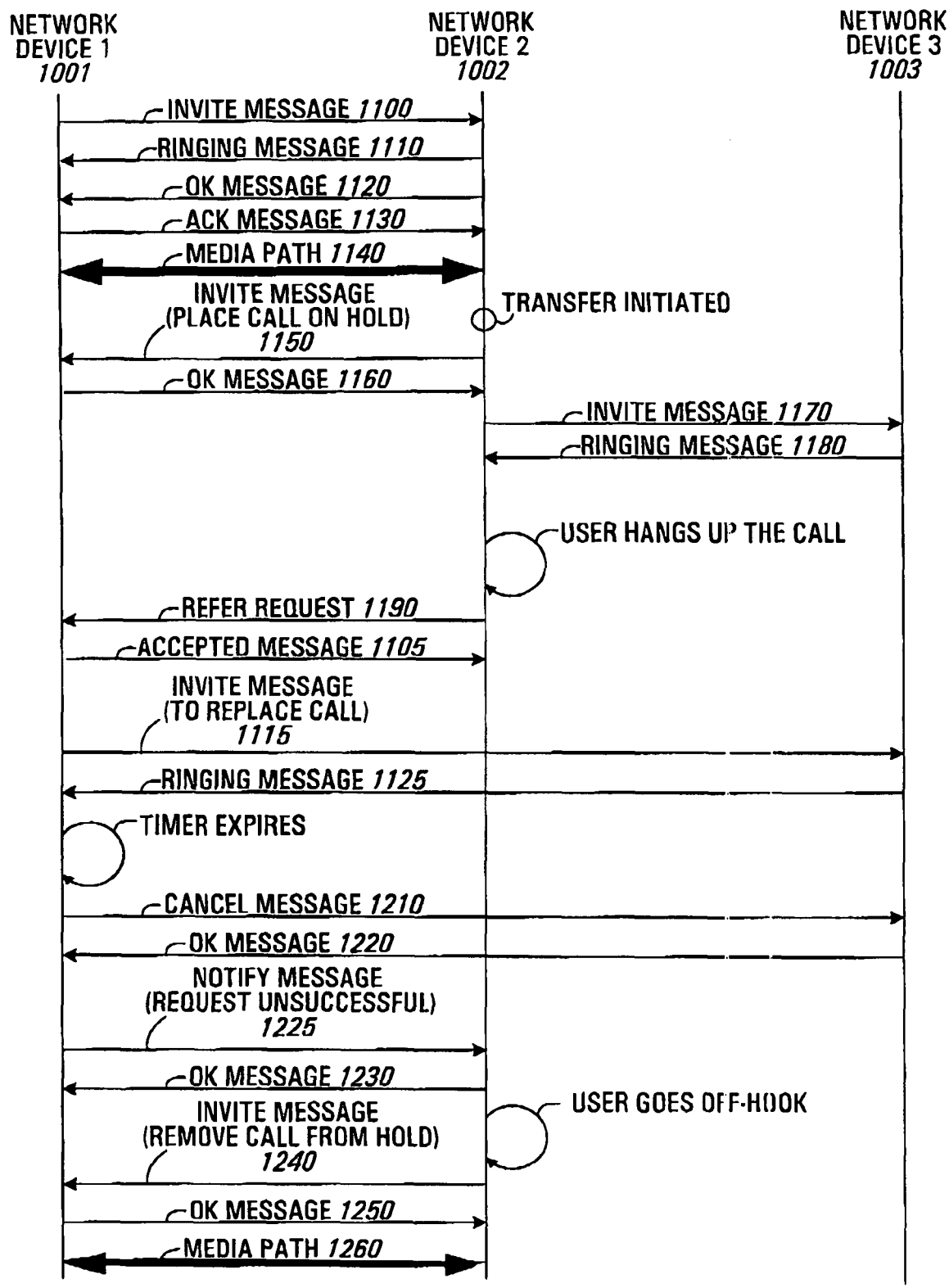
FIG. 13 is a signal flow diagram of an example implementation of a blind transfer of a call in a distributed peer-to-peer network when a target network device does not answer.

Referring to FIG. 13, shown is a signal flow diagram of an example implementation of a blind transfer of a call in a distributed peer-to-peer network when a target terminal set does not answer. In this example, the first network device 1001 calls the second network device 1002 and the media path 1140 between the first and second network devices 1001, 1002 is established as described with reference to FIG. 12. A user at the second network device 1002 wishes to transfer the call to the third network device 1003 and initiates the transfer by pressing a transfer key on the second network device 1001. The call with the first network device 1001 is placed on hold and the user at the second network device 1002 is provided with a dial tone. To place the call on hold the INVITE message 1150 is sent to the first network device 1001. Part of the INVITE message 1150 includes information to disable media communication between the first and second network devices 1001, 1002. The INVITE message 1150 is confirmed by the first network device 1001 with the OK message 1160. The user at the second network device 1002 enters a desired destination by dialing a number and the second network device 1002 looks up the dialed number in its routing table, performs a translation of the dialed number to an IP address and initiates a connection by sending the INVITE message 1170 to the third network device 1003. The third network device 1003 responds to the second network device 1002 with the RINGING message 1180. Upon receipt of the RINGING message 1180 at the second network device 1002, a ringback tone is played to the user at the second network device 1002 via a handset or speaker phone. The user at the second network device 1002 then hangs up the call to complete the blind transfer. The second network device 1002 then initiates the REFER request 1190 to the first network device 1001. The first network device 1001 accepts the REFER request 1190 and responds to the second network device 1002 with ACCEPTED message 1105 to indicate that the REFER request 1190 has been understood. The first network device 1001 then sends the INVITE message 1115 to the third network device 1003. The third network device 1003 receives the INVITE message 1115, locates the current call with the second network device 1002 and switches its internal state to point to the first network device 1001. The third network device 1003 responds to the first network device 1001 with the RINGING message 1125 if the current call state is RINGING. In this example, the call from the first network device 1001 is not answered after a set interval of time, a timer expires on the first network device 1001, and the first network device 1001 cancels its request to replace the call with the second network device 1002 by sending a CANCEL message 1210 to the third network device 1003. The CANCEL message 1210 is confirmed by the third network device 1003 with an OK message 1220 which is sent to the first network device 1001. The first network device 1001 then sends a NOTIFY message 1225 to the second network device 1002 indicating that the REFER request 1190 was unsuccessful and the second network device 1002 responds with an OK message 1230. A user at the second network device 1002 is provided with an audio and/or visual alert. For example, the second network device 1002 plays a ringer on the second network device 1002. When the user at the second network device 1002 answers the call by going off-hook, the second network device 1002 sends an INVITE message 1240 to the first network device 1001 to remove from hold the original call between the first and second network devices 1001, 1002. The first network device 1001 responds to the INVITE message 1240 by sending an OK message 1250 to the second network device 1002. A media path 1260 is re-established between the first and second network devices 1001, 1002 and the call to the user at the second network device 1002 resumes. When the call resumes, the user at the second network device 1002 may optionally transfer the call to another network device using for example the signalling sequence of FIG. 12. Alternatively, the user may take a message on behalf of the intended recipient.

In the blind transfers of FIGS. 12 and 13, the blind transfers initiated at the second network device 1002 are completed while the third network device 1003 is still ringing; however, this is not always the case and a user at the third network device 1003 may answer a call associated with the the INVITE message 1170 from the second network device 1002 before the transfer is completed and before the first network device 1001 has a chance to send the INVITE message 1115 to the third network device 1003 for replacing the call from the third network device 1003. In such a case, in a blind transfer the user at the second network device 1002 may not be aware that the call associated with the INVITE message 1170 to the third network device 1003 has been answered and the user at the second network device 1002 may hang-up the call to the third network device 1003 before a media path between the second and third network devices 1002, 1003 is established. Such a case will now be described below with reference to FIG. 14. In yet another case, a media path between the second and third network devices 1002, 1003 may be established before the transfer is completed and before the first network device 1001 has a chance to send the INVITE message 1115 to the third network device 1003 for replacing the call from the second network device 1002. Such a case, is referred to as a consultation transfer regardless of whether the second network device 1002 is aware that a media path has been established and is described herein below with reference to FIG. 15.

Figure 14:
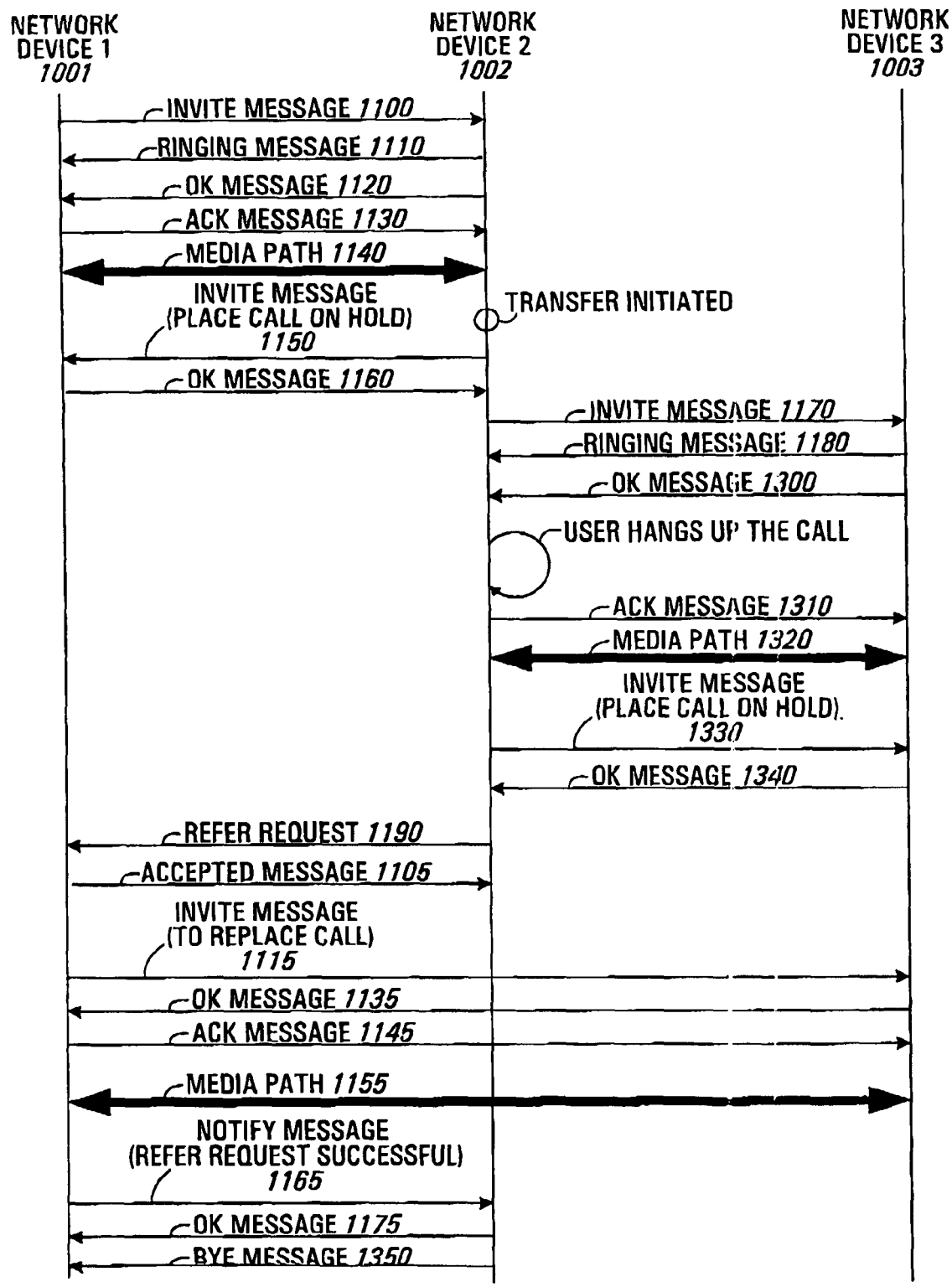
FIG. 14 is a signal flow diagram of an example implementation of a transfer of a call in a distributed peer-to-peer network when a target network device answers the call prior to the transfer, according to another embodiment of the invention.

Referring to FIG. 14, shown is a signal flow diagram of an example implementation of a transfer of a call in a distributed peer-to-peer network when a target network device answers the call prior to the transfer, according to another embodiment of the invention. In the example implementation, the media path 1140 between the first and second network devices 1001, 1002 is established and a transfer is initiated by a user at the second network device 1002 as discussed with reference to FIG. 12. The user at the second network device 1002 initiates a call for the first network device 1001 by sending the INVITE message 1170 to the third network device 1003. The third network device 1003 responds to the second network device 1002 with RINGING message 1180. A user at the third network device 1003 answers the call from the second network device 1002 and the third network device 1003 sends an OK message 1300 to the second network device 1002 to indicate that the call has been answered. Under this condition, the call is treated as a consultation transfer. In the example implementation of FIG. 14, the user at the second network device 1002 hangs up or presses a transfer key to complete the transfer, and the second network device 1002 sends to the third network device 1003 an ACK message 1310 in response to the OK message 1300. A media path 1320 is then established. The second network device 1002 then sends an INVITE message 1330 to the third network device 1003 to place the call on hold and the third network device 1003 replies with an OK message 1340. In some implementations, there is no INVITE message 1330 and no OK message 1340. The media path between the second and third network devices 1002, 1003 is set up momentarily and immediately placed on hold prior to the REFER request 1190 being sent to the first network device 1001 for transferring the call between the first and second network devices 1001, 1002. The first network device 1001 accepts the REFER request 1190 and responds with ACCEPTED message 1105 to indicate that the REFER request 1190 has been understood. The first network device 1001 then sends INVITE message 1115 to the third network device 1003. The third network device 1003 receives the INVITE message 1115 and locates the current call between the second and third network devices 1002, 1003 and switches its internal state to point to the first network device 1001. The third network device 1003 then responds with OK message 1135. The first network device 1001 acknowledges receipt of the OK message 1135 with ACK message 1145 sent to the third network device 1003 and the media path 1155 between the first and third network devices 1001, 1003 is established. Finally, the first network device 1001 sends NOTIFY message 1165 to the second network device 1002 to indicate to the second network device 1002 that the REFER request 1190 is successful and completed. The second network device 1002 responds to the first network device 1001 with OK message 1175 to indicate receipt of the Notify message 1165. The second network device 1002 then terminates the media path 1140 between the first and second network devices 1001, 1002 with a BYE message 1350. The media path 1320 between the second and third network devices 1002, 1003 which is replaced by the media path 1155 between the first and third network devices 1001, 1003 is terminated with a BYE message (not shown). The BYE message 1350 is sent by one of the first and third network devices 1001, 1003 that is first hung up after a conversation has ended.

Other embodiments of the invention provide methods network devices, and systems adapted to deliver consultation transfers.

This is similar to the previously described embodiments, but upon receipt of a response from a transferee, and prior to sending a message to the originator containing a reference to the transferee, the call processing module of the original recipient is adapted to establish a media path with the transferee.

Figure 15:
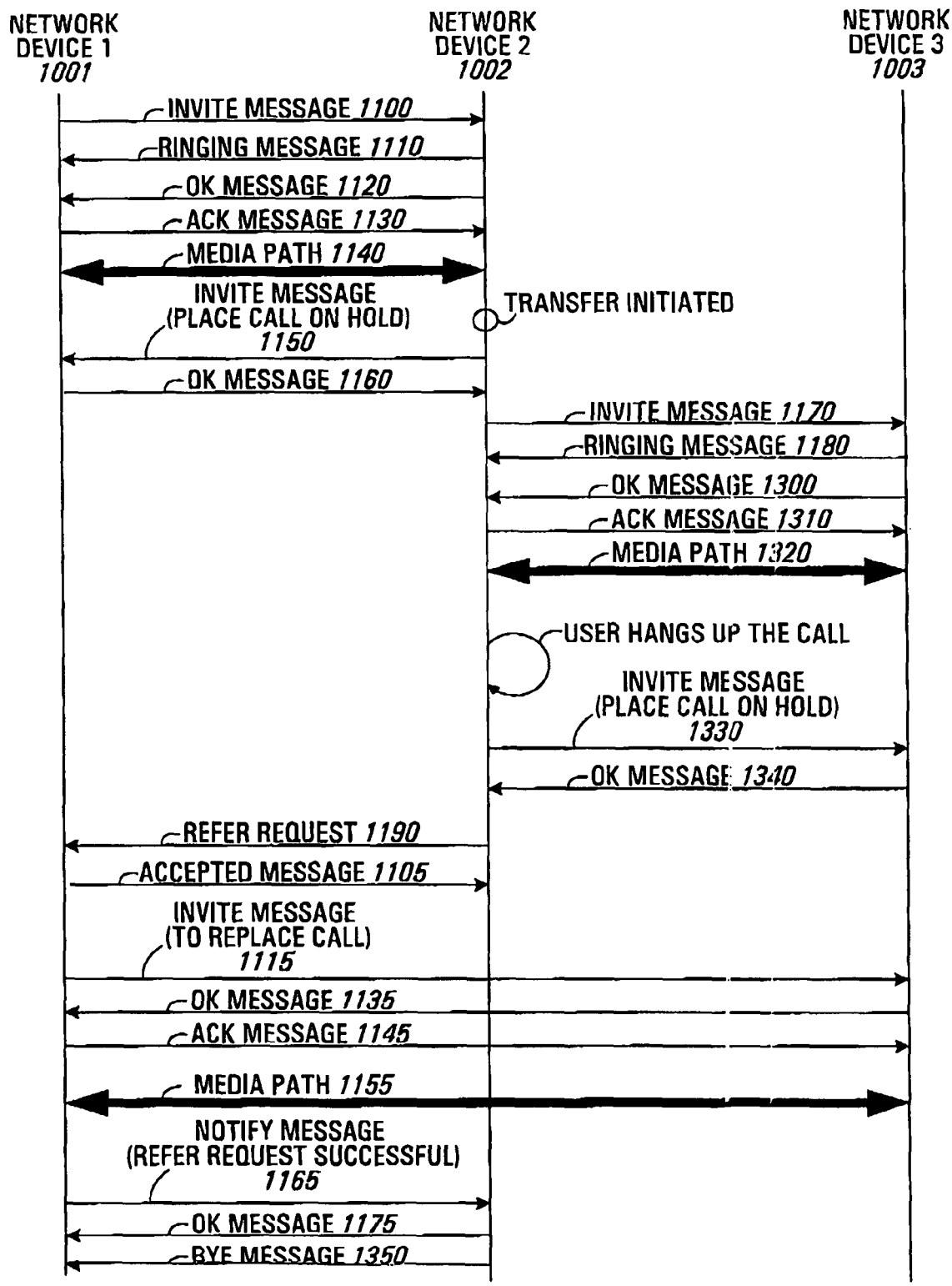
FIG. 15 is a signal flow diagram of an example implementation of a consultation transfer of a call in a distributed peer-to-peer network, according to another embodiment of the invention.

Referring to FIG. 15, shown is a signal flow diagram of an example implementation of a consultation transfer of a call in a distributed peer-to-peer network, according to another embodiment of the invention. In the example implementation of FIG. 15, a user at the first network device 1001 calls another user at a second network device 1002. The media path 1140 is established between the first and second network devices 1001, 1002, a conversation takes place and a transfer is initiated, as described with reference to FIG. 12. In a similar manner to FIG. 12, the user at the second network device 1002 wishes to transfer the call to the third network device 1003 and initiates the transfer by pressing a transfer key on the second network device 1002. To place the call on hold the second network device 1002 sends INVITE message 1150 to the first network device 1001. The INVITE message 1150 is confirmed by the first network device 1001 with OK message 1160 sent to the second network device 1002. The user at the second network device 1002 is then provided with a dial tone. The user at the second network device 1002 enters the desired destination and the second network device 1002 performs a translation of the dialed number to an IP address using its routing table and sends INVITE message 1170 to the third network device 1003. The third network device 1003 responds with RINGING message 1180. When the user at the third network device 1003 answers the call, OK message 1300 is sent to the second network device 1002. The OK message 1300 is acknowledged by the second network device 1002 with ACK message 1310 sent to the third network device 1003. The media path 1320 is setup between the second and third network devices 1002, 1003 and the user at the second network device 1002 consults with a user at the third network device 1003. The user at the second network device 1002 completes the transfer by hanging up or by using any other suitable method such as, for example, pressing the transfer key again to complete the transfer. The call between the second and third network devices 1002, 1003 is placed on hold by having the second network device 1002 send INVITE message 1330 to the third network device 1003. The INVITE message 1330 is confirmed by the third network device 1003 with OK message 1340 sent to the second network device 1002. Note that the messaging sequences of FIGS. 14 and 15 are different in that in FIG. 14 the user at the second network device 1002 hangs up before the media path 1320 is established whereas in FIG. 15 the user at the second network device 1002 hangs up after the media path 1320 is established. After the call between the second and third network devices 1002, 1003 has been placed on hold, the second network device 1002 sends REFER request 1390 to the first network device 1001. The first network device 1001 accepts the REFER request 1190 and responds with ACCEPTED message 1105 to indicate that the REFER request 1190 has been understood. The first network device 1001 then sends INVITE message 1115 to the third network device 1003. The third network device 1003 receives the INVITE message 1115 and locates the call from the second network device 1002 and switches its internal state to point to the first network device 1001. The third network device 1003 sends OK message 1135 to the first network device 1001. The first network device 1001 acknowledges the receipt of the OK message 1135 with ACK message 1145 sent to the third network device 1003 and the media path 1155 between the first and third network devices 1001, 1003 is established. Finally, the first network device 1001 sends the NOTIFY message 1165 to the second network device 1002 to indicate to the second network device 1002 that the REFER request 1190 is successful and completed. The second network device 1002 responds to the first network device 1001 with OK message 1175 to indicate receipt of the Notify message 1165. The media path 1140 between the first and second network devices 1001, 1002 is terminated using BYE message 1350, which is sent from the second network device 1002 to the first network device 1001.

With reference to FIGS. 16 to 20, given below is a further description of the functionality of each one of network devices 1001, 1002, 1003 during a call transfer.

In FIGS. 16 to 20, it is to be understood that the original caller is the first network device 1001; the original recipient is the second network device 1002; and the transferee is the third network device 1003.

Figure 16:
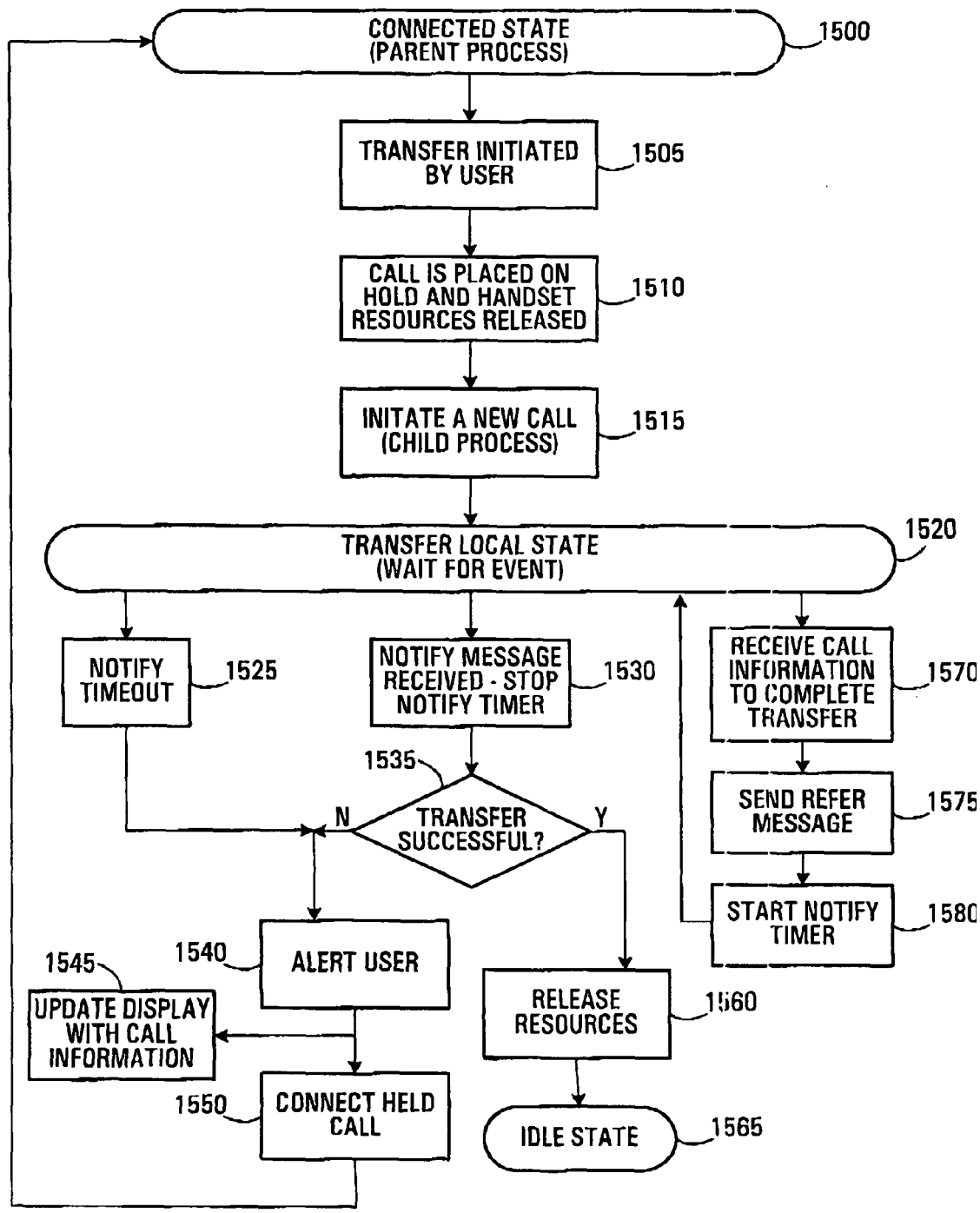
FIG. 16 is a flow chart of steps followed by a network device performing a call transfer.
Figure 17:
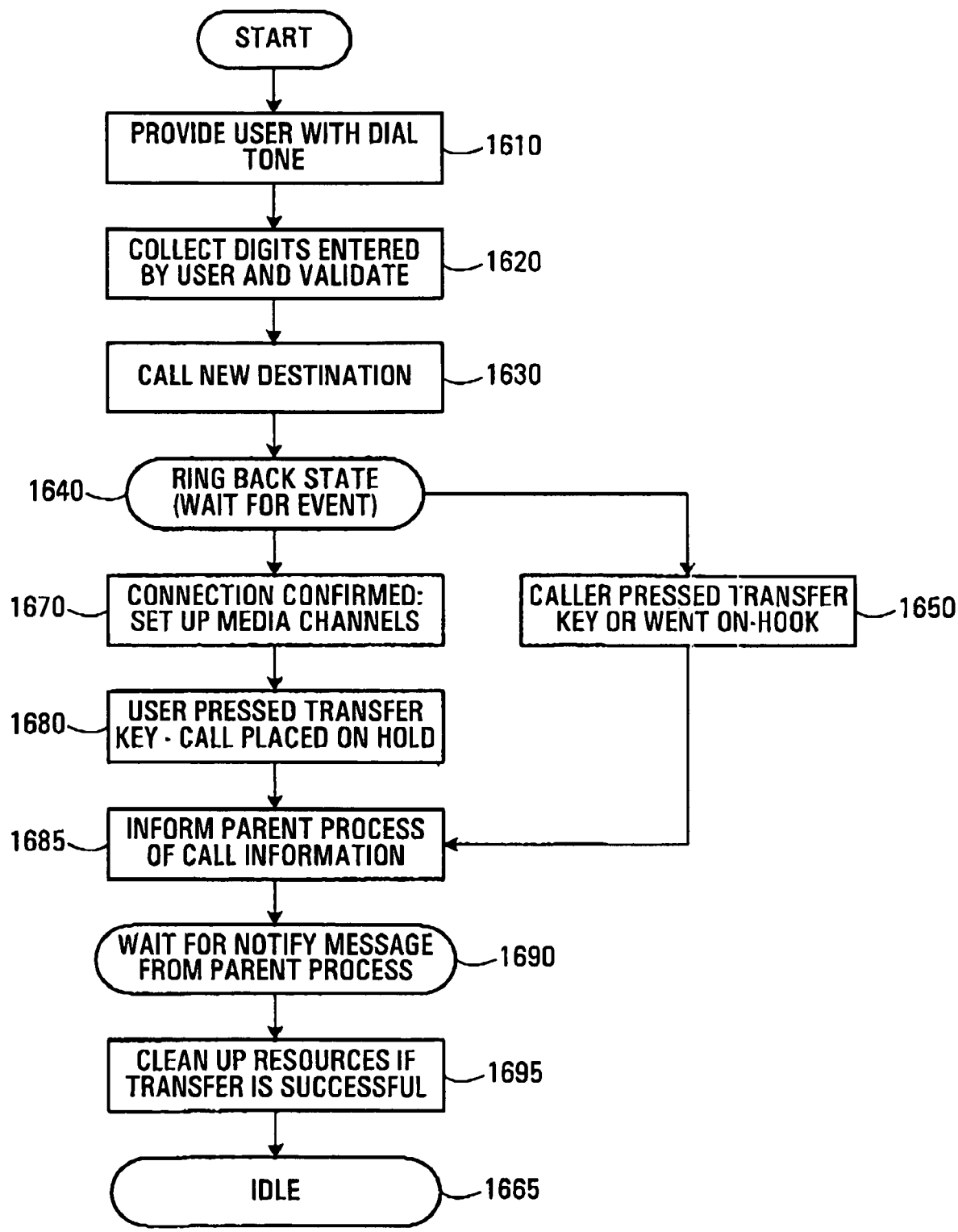
FIG. 17 is a flow chart of steps followed by a network device in establishing a connection with a new destination network device during the call transfer.
Figure 18:
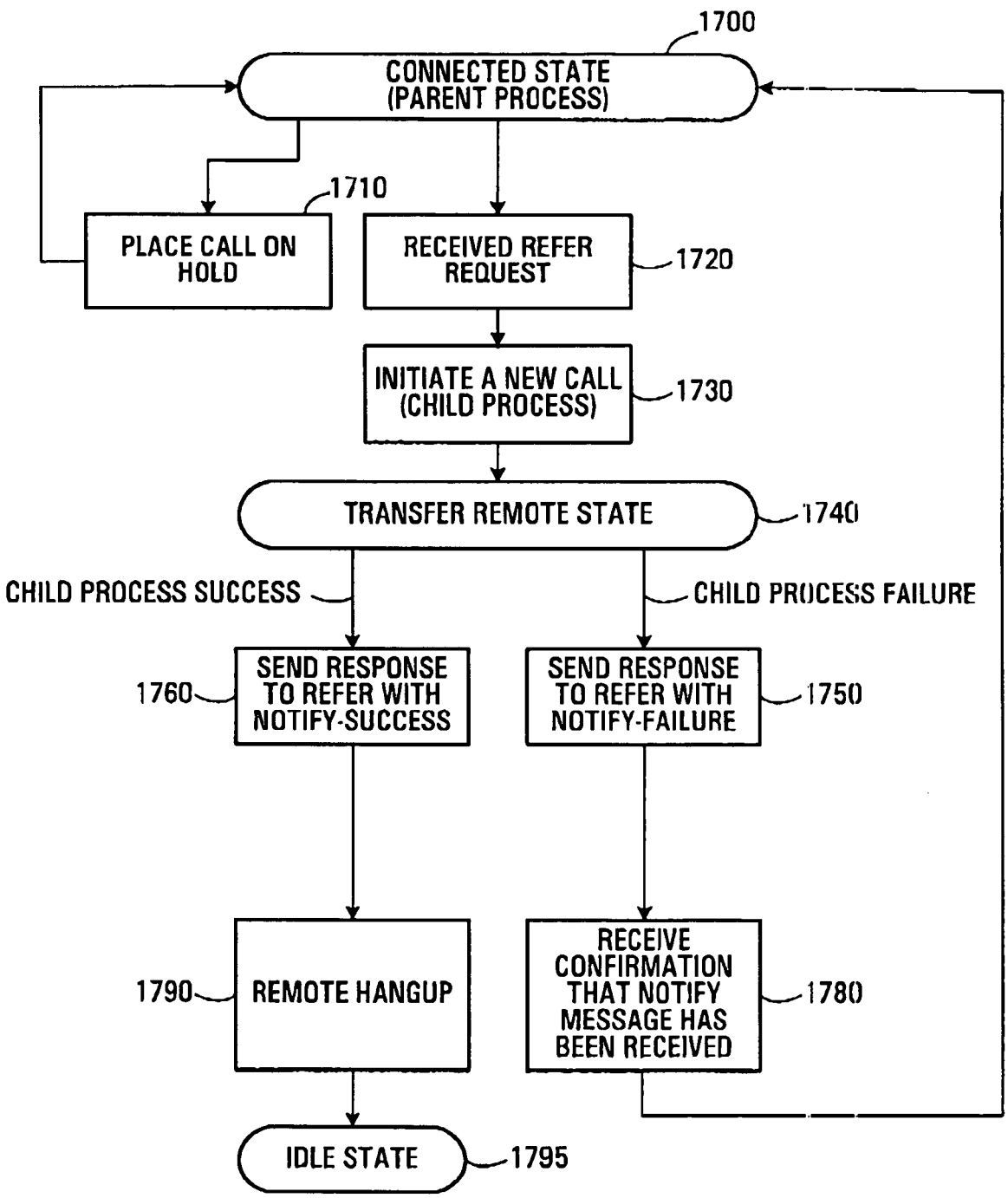
FIG. 18 is a flow chart of steps followed by an originator network device during a call transfer.
Figure 19:
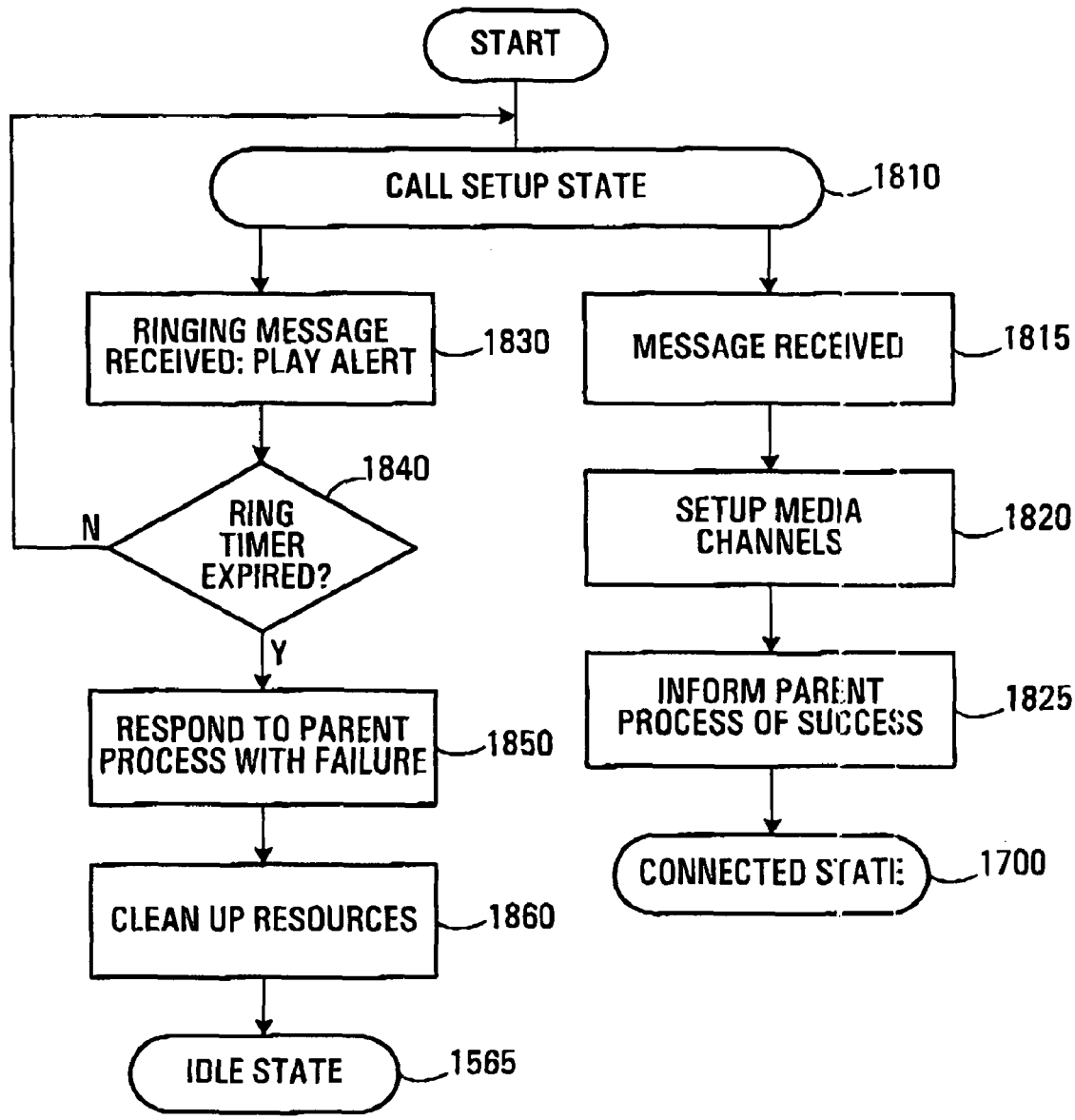
FIG. 19 is a flow chart of steps followed by an originator network device in establishing a connection with a new destination network device during the call transfer.
Figure 20:
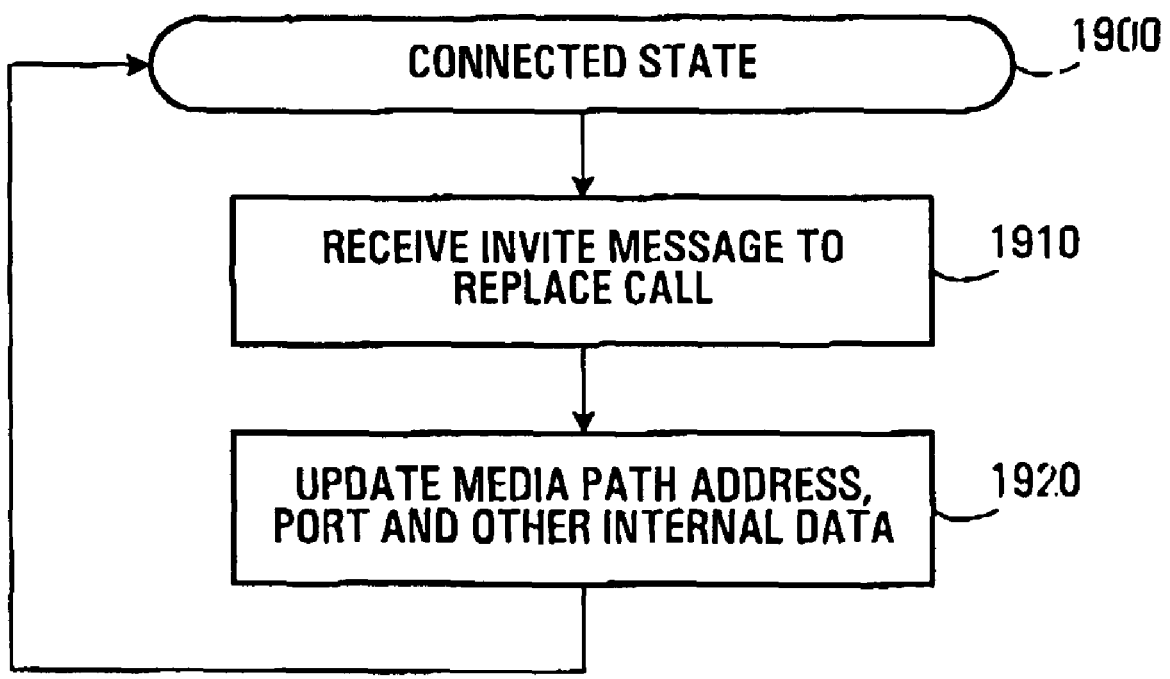
FIG. 20 is a flow chart of steps followed by a new destination network device to which a call is being transferred.

FIGS. 16 and 17 are specific to the original recipient (the second network device 1002). FIG. 20 is specific to the transferee (the third network device 3003). FIGS. 18 and 19 are specific to the original caller (the first network device 1001).

In FIG. 16, it is assumed that a call exists between the first and second network devices 1001, 1002 and that they are in a connected state of a parent process, (step 1500). A user at the second network device 1002 initiates a transfer (step 1505) by pressing the transfer key. The call is placed on hold (step 1510). In addition, the handset and speaker phone resources are released since they will be required later. A child process is spawned (step 1515) which initiates a call between the second network device 1002 and the third network device 1003. The current parent process waits for an event in a transfer local state (step 1520). This state waits for the child process of step 1515 to provide an indication that the user wants to complete the transfer and waits for an event. The event might be: 1) receipt of call information associated with the call that the user has initiated corresponding to the call to the third network device 1003 in this example; 2) receipt of a Notify message indicating that the call transfer is complete; or 3) a time out by a Notify timer, which times a waiting period for the Notify message. At step 1570, the call information associated with the call that the user has initiated (the call to the third network device 1003 in this example) is received. The call information is packaged as a REFER message (step 1575) and is sent to the first network device 1001. The Notify timer is then started (step 1580) for the case in which the transfer is not successful. The current process waits for further events (step 1520). At step 1530 a Notify Message received and the Notify timer is stopped. The Notify message is tested (step 1535) for success or failure and if the transfer is successful resources that are no longer required are released (step 1560) and returns to an idle state (step 1565). At step 1535, if the Notify message received indicates an unsuccessful transfer or, at step 1520), if the notify timer times out (step 1525) the call processing module alerts the user at the second network device 1002 using for example a ringing signal and/or a visual display (step 1540) and immediately updates a display with the status of the unsuccessful call transfer (step 1545). Once the user lifts the handset, the call processing module connects the held call (step 1550) and the processing module returns to a connected state (step 1555).

Further details of the child process of step 1515 of FIG. 16 in which a call between the second and third network devices 1002, 1003 is initiated will now be described with reference to FIG. 17. In FIG. 17, in initiating the new call a dial tone is provided to the user at the second network device 1002 (step 1610). The user enters a number for the transferee corresponding to the third network device 1003 in this example to transfer the call and the number is validated (step 1620) using configured dialing rules. After the number has been validated, the new call is initiated by sending an INVITE message (step 1630). A ring back state is entered after getting a RINGING message from the transferee in which the user is given a ringing tone (step 1640). The user may optionally press the transfer key or hang up (on-hook) (step 1650) to complete a blind transfer. The parent process which spawns the child process for initiating the new call is provided with call information (step 1685). The call information being provided includes but is not limited to a call ID and other information such as destination information for the third network device 1003 for example. The third network device 1003 then waits for a Notify message from the parent process (step 1690). If a successful Notify message is received from the parent process, then resources that are no longer required are released (step 1695) and the system returns to an idle state (step 1665).

At step 1640, in the ring back state if a message indicating that a connection is established with the third network device 1003 is received (step 1670), media channels are setup (step 1670). The user may at this point consult with the transferee party and may release the call (not shown) if the transferee party does not wish to take the call. If the transferee party wishes to take the call, the user at the second network device 1002 may press the transfer key or go on-hook to complete a consultative transfer. The call between the second and third network devices 1002, 1003 is placed on hold (step 1680). The parent process is then provided with call information (step 1685) and steps 1690, 1695, 1665 are performed as described above.

With reference to FIGS. 18 and 19 an example implementation will now be described in which the first network device 1001 serves as an originator network device. In FIG. 18, shown is a flow chart of steps followed by an originator network device corresponding to the first network device 1001 during a call transfer. At step 1700, the first network device 1001 is in a connected state with all original recipient corresponding to the second network device 1002. When the second network device 1002 initiates the call transfer, the call is placed on hold by sending an INVITE message to the first network device 1001. Upon receipt of the INVITE message the call between the first and second network devices 1001, 1002 is placed on hold (step 1710) and the first network device 1001 returns to the connected state (step 1700). The second network device 1002 initiates a call with the transferee corresponding to the third network device 1003 and when the user at the second network device 1002 signals that he or she wishes to complete the transfer, a REFER request is sent to the first network device 1001 with the REFER request containing call information as described above with reference to FIG. 10. When the REFER request (step 1720) is received, a new child process is spawned to create a new call between the first and third network devices 1001, 1003 (step 1730). The first network device 1001 enters into a transfer remote state (step 1740) and waits for the child process of step 1730 to complete its task. When the task is completed a success (step 1760) or failure (step 1750) event is received and an appropriate NOTIFY message is sent to the second network device 1002. Upon receipt of a confirmation that the NOTIFY message was successfully received by the second network device 1002 (step 1780), the first network device 1001 returns to the connected state (step 1700). The second network device 1002, upon receipt of a NOTIFY MESSAGE indicating a successful transfer will terminate the call between the first and second network devices 1001, 1002 as it is no longer required; however, it is also possible to receive a remote hang-up (step 1790) (on-hook) from the transferee in which case the call is terminated and resources are released. The first network device 1001 then enter an Idle State (step 1795).

The details of the child process of step 1730 in which the new call between the first and third network devices 1001, 1003 is initiated will now be described with reference to FIG. 19. In particular, the new call is initiated on the basis of a REFER request containing a call ID. In FIG. 19, an INVITE message is generated with the same call ID supplied by the REFER message with instructions to replace the original recipient (the second network device 1002) with the original caller (the first network device 1001). The INVITE message is sent and the first network device 1001 enters a call setup state and waits for a response from the third network device 1003 (the transferee) (step 710). Depending on the type of transfer initiated by the second network device 1002, a RINGING message (for a blind transfer) or an OK message (for a consultative transfer) is received. If a RINGING message is received, a ringing alert is played to the user (step 1830) via a handset and continues until a ringing timer has expired (step 1840). If the ringing timer expires, the ringing alert is stopped and the parent process is informed that the transfer was unsuccessful (step 1850), internal resources are cleaned up (step 1860) and the child process returns to the idle state (step 1795). If the response is an OK message indicating that a connection is being established (step 1815), media channels are setup between the first and third network devices 1001, 1003 (step 1820), the parent process is informed that the connection is successful (step 1825) and the parent process goes into a connected state (step 1700).

Referring to FIG. 20, shown is a flow chart of steps followed by a transferee network device to) which a call is being transferred. In this example, the transferee the network device corresponds to the third network device 1003 and shown is an example of an attended transfer. At step 1900, the third network device 1003 is in a connected state with the second network device 1002 as would be the case for a consultation transfer. At step 1910 an INVITE message for a new call is received from the first network device 1001 with the INVITE message containing a call ID corresponding to the call between the second and third network devices 1002, 1003. Upon receipt of the INVITE message, a media path address, port and other internal data are updated (step 1920) to ensure connection for the new call is now directed to the first network device 1001. The third network device 1003 then returns to the connected state (step 1900).

The foregoing merely illustrates the principles of the invention and it will thus be appreciated that those skilled in the art will be able to devise numerous alternative arrangements, which, although not explicitly described herein, embody the principles of the invention and are within its spirit and scope. For example, the inventive concept was described for a distributed peer-to-peer telephone system, the idea is extensible to non-distributed or partially distributed systems.

Numerous modifications and variations of the present invention are possible in light of the above teachings. It is therefore to be understood that within the scope of the appended claims, the invention may be practised otherwise than as specifically described herein.

The invention claimed is:

1. A network device adapted to process a call between the network device and a first other network device, the network device comprising:
   a user interface adapted to receive a user input requesting a call transfer to a second other network device; and
   a call transfer function responsive to the user input to deliver call transfer functionality by, upon receipt of the user input:
   a) initiating a connection from the network device to the second other network device; and
   b) sending a first message to the first other network device containing a reference to the second other network device.

2. A network device according to claim 1 wherein the call transfer function is further adapted to, upon receipt of the input:
   (c) send a second message to the first other network device to place the call on hold.

3. A network device according to claim 1 comprising a call processing module adapted to process the call, the call processing module comprising the call transfer function.

4. A network device according to claim 3 wherein the first message contains a reference to the connection.

5. A network device according to claim 2 wherein the call transfer function is adapted to send the second message after a user at the network device hangs up or presses a transfer key.

6. A network device according to claim 3 wherein the call processing module is adapted to terminate the call upon receiving a message from the first other network device, which represents that the first other network device has established a media path with the second other network device.

7. A network device according to claim 3 wherein the call processing module is adapted to send the first message before or after a media path is established with the second other network device.

8. A network device according to claim 5 wherein the first message is sent upon receipt of a response from the second other network device and wherein upon receipt of the response from the second network device, and prior to sending the first message to the first other network device containing a reference to the connection, the call processing module is adapted to establish a media path between the network device and the second other network device.

9. A network device according to claim 8 wherein the call processing module is adapted to send the first message to the first other network device upon a user input from a user at the network device hanging up or pressing a transfer key, the first message being sent before or after the media path between the network device and the second other network device is established.

10. A network device according to claim 3 wherein the call processing module is further adapted to process an other call from the network device to a first network device other than the network device;
   the call processing module being further adapted to participate in a call transfer of the other call by:
   a) responding to a message from the first network device to be placed on hold with a message accepting the hold;
   b) responding to a message from the first network device containing a reference to a second network device other than the network device and the first network device by sending a message to the second network device containing a reference to the first network device so as to initiate setting up a connection from the network device to the second network device.

11. A network device according to claim 3 wherein the a call processing module is further adapted to participate in a call transfer of an other call from a first network device other than the network device to a second network device other than the network device and the first network device by:
   a) responding to a message from the second network device initiating a connection between the network device and the second network device by sending a message indicating that the connection has been initiated; and b) responding to a message from the first network device containing a reference to the second network device by replacing the connection between the network device and the second network device with another connection between the network device and the first network device.

12. A network device according to claim 1 wherein the network device is one of a telephone, a video phone, a PDA (Personal Digital Assistant), a soft phone, a wireless device, a wireless telephone, and a cell phone.

13. A network device according to claim 1 wherein the network device is a VoIP (Voice over Internet Protocol) telephone.

14. A network device adapted to process a call between the network device and a first other network device, the network device comprising:
a call set up function for setting up the call; and
a call transfer function adapted to participate in a call transfer of the call by:
responding to a first message from the first other network device containing a reference to a second other network device by establishing a media path with the second other network device.

15. A network device according to claim 14 wherein the call transfer function is further adapted to respond to a message from the first other network device for placing the call on hold with a message accepting the hold.

16. A network device according to claim 14 comprising a call processing module adapted, to process the call, the call processing module comprising the call transfer function.

17. A network device according to claim 14 wherein to establish the media path the call transfer function is adapted to send a second message to the second other network device containing a reference to the first network device so as to initiate setting up a connection, wherein the first message and the second message contain a reference to a call between the first other network device and the second other network device.

18. A network device according to claim 16 wherein the call processing module is adapted to send a second message for terminating the call from the network device to the first other network device after establishing a media path with the second other network device.

19. A network device according to claim 16 wherein the call processing module is further adapted to re-establish a media path with the first other network device set if attempts to establish a media path with the second other network device set fail.

20. A network device according to claim 14 wherein the network device is one of a telephone, a video phone, a PDA (Personal Digital Assistant), a soft phone, a wireless device, a wireless telephone, a cell phone, and TTI (Thin Trunk Interface).

21. A network device according to claim 14 wherein the network device is a VoIP (Voice over Internet Protocol) telephone.

22. A network device, comprising:
a call set up function being adapted to set up a call between the network device and a first other network device; and
a call transfer function being adapted to participate in a call transfer of a call between the first other network device and a second other network device by:
after receiving a first message from the second other network device initiating a connection between the network device and the second other network device, responding to a second message from the first other network device containing a reference to the second other network device by replacing a connection between the network device and the second other network device with an other connection between the network device and the first other network device.

23. A network device according to claim 22 comprising a call processing module adapted to process the call, the call processing module comprising the call transfer function.

24. A network device according to claim 22 wherein the second message contains a reference to the connection between the network device and the second other network device.

25. A network device according to claim 22 wherein the network device is one of a telephone, a video phone, a PDA (Personal Digital Assistant), a soft phone, a wireless device, a wireless telephone, a cell phone, and a TTI (Thin Trunk Interface).

26. A network device according to claim 22 wherein the network device is a VoIP (Voice over Internet Protocol) telephone.

27. In a network, a system comprising:
a plurality network devices on the network, each network device of the plurality of network devices comprising:
a user interface adapted to receive a user input requesting a call transfer;
a call transfer function adapted to:
(i) participate in a call transfer of a first call between the network device and a first other network device using local call transfer functionality, the first call being transferred from the network device to a second other network device;
(ii) participate in a call transfer of a second call between the network device and the first other network device using local call transfer functionality, the second call being transferred from the first other network device to the second other network device; and
(iii) participate in a call transfer of a third call between the first other network device and the second other network device using local call transfer functionality, the third call being transferred from the first other network device to the network device.

28. A system according to claim 27 further comprising:
a TTI (Thin Trunk Interface) having a call transfer function adapted to provide local call transfer functionality as a transferee of a call for network devices external to the network.

29. A system according to claim 27 further comprising:
a TTI (Thin Trunk Interface) having a call transfer function adapted to provide local call transfer functionality as an originator of a call for network devices external to the network.

30. A system according to claim 27 wherein each network device is one of a telephone, a video phone, a PDA (Personal Digital Assistant), a soft phone, a wireless device, a wireless telephone, and a cell phone.

31. A system according to claim 27 wherein each network device is a VoIP (Voice over Internet Protocol) telephone.

32. An article of manufacture comprising:
a computer usable medium having computer readable program code means embodied therein for providing call transfer functionality at a network device, the computer readable code means in said article of manufacture comprising:
computer readable code means for processing a call between the network device and a first other network device; computer readable code means for receiving a user input requesting a call transfer to a second other network device; and computer readable code means for to delivering call transfer functionality in response to the user input by, upon receipt of the user input:
  a) initiating a connection from the network device to the second other network device;
  b) sending a first message to the first other network device containing a reference to the second other network device.

33. An article of manufacture according to claim 32 wherein the computer readable code means in said article of manufacture comprise computer readable code means for:
  upon receipt of the user input, sending a second message to the first other network device to place the call on hold.

34. An article of manufacture according to claim 32 wherein the first message contains a reference to the connection.

35. An article of manufacture according to claim 33 wherein the computer readable code means in said article of manufacture comprises computer readable code means for sending the second message after a user at the network device hangs up or presses a transfer key.

36. An article of manufacture according to claim 32 wherein the computer readable code means in said article of manufacture comprises computer readable code means for terminating the call upon receiving a message from the first other network device, which represents that the first other network device has established a media path with the second other network device.

37. An article of manufacture according to claim 32 wherein the computer readable code means in said article of manufacture comprises computer readable code means for sending the first message before or after a media path is established with the second other network device.

38. An article of manufacture according to claim 32 wherein the first message is sent upon receipt of it response from the second other network device and wherein the computer readable code means in said article of manufacture comprises computer readable code means for:
  upon receipt of the response from the second network device and prior to sending the first message to the first other network device containing a reference to the connection, establishing a media path between the network device and the second other network device.

39. An article of manufacture according to claim 38 wherein the computer readable code means in said article of manufacture comprises computer readable code means for sending the first message to the first other network device upon a user input from a user at the network device hanging up or pressing a transfer key, the first message being sent before or after the media path between the network device and the second other network device is established.

40. An article of manufacture according to claim 32 wherein the computer readable code means in said article of manufacture comprises:
  computer readable code means for processing an other call from the network device to a first network device other than the network device; and computer readable code means for participating in a call transfer of the other call by:
  a) responding to a message from the first network device to be placed on hold with a message accepting the hold;
  b) responding to a message from the first network device containing a reference to a second network device other than the network device and the first network device by sending a message to the second network device containing a reference to the first network device so as to initiate setting up a connection from the network device to the second network device.

41. An article of manufacture according to claim 32 wherein the computer readable code means in said article of manufacture comprises computer readable code means for participating in a call transfer of an other call from a first network device other than the network device to a second network device other than the network device and the first network device by:
  a) responding to a message from the second network device initiating a connection between the network device and the second network device by sending a message indicating that the connection has been initiated; and
  b) responding to a message from the first network device containing a reference to the second network device by replacing the connection between the network device and the second network device with another connection between the network device and the first network device.

42. An article of manufacture according to claim 32 wherein the network device is one of a telephone, a video phone, a FDA (Personal Digital Assistant), a soft phone, a wireless device, a wireless telephone, and a cell phone.

43. An article of manufacture according to claim 32 wherein the network device is a VoIP (Voice over Internet Protocol) telephone.

44. An article of manufacture comprising:
  a computer usable medium having computer readable program code means embodied therein for providing call transfer functionality at a network device, the computer readable code means in said article of manufacture comprising:
  computer readable code means for processing a call between the network device and a first other network device; and
  computer readable code means for participating in a call transfer of the call by:
  responding to a first message from the first other network device containing a reference to a second other network device by establishing a media path with the second other network device.

45. An article of manufacture according to claim 44 wherein the computer readable code means in said article of manufacture comprise computer readable code means for responding to a third message from the first other network device for placing the call on hold with a fourth message accepting the hold.

46. An article of manufacture according to claim 44 comprising computer readable code means for sending a second message to the second other network device containing a reference to the first other network device so as to initiate setting up a connection for establishing the media path, wherein the first message and the second message contain a reference to a call between the first other network device and the second other network device.

47. An article of manufacture according to claim 44 wherein the computer readable code means in said article of manufacture comprises computer readable code means for sending a second message for terminating the call from the network device to the first other network device after establishing a media path with the second other network device.

48. An article of manufacture according to claim 44 wherein the computer readable code means in said article of manufacture comprises computer readable code means for re-establishing a media path with the first other network device set if attempts to establish a media path with the second other network device set fail.

49. An article of manufacture according to claim 44 wherein the network device is one of a telephone, a video phone, a PDA (Personal Digital Assistant), a soft phone, a wireless device, a wireless telephone, a cell phone, and a TTI (Thin Trunk Interface).

50. An article of manufacture according to claim 44 wherein the network device is a VoIP (Voice over Internet Protocol) telephone.

51. An article of manufacture comprising:
a computer usable medium having computer readable program code means embodied therein for providing call transfer functionality at a network device, the computer readable code means in said article of manufacture comprising:
computer readable code means for participating in a call transfer of call between a first other network device and a second other network device by:
after receiving a first message from the second other network device initiating a connection between the network device and the second other network device, responding to a second message from the first others network device containing a reference to the second other network device by replacing the connection between the network device and the second other network device with an other connection between the network device and the first other network device.

52. An article of manufacture according to claim 51 wherein the second message contains a reference to the connection between the network device and the second other network device.

53. An article of manufacture according to claim 51 wherein the network device is one of a telephone, a video phone, a PDA (Personal Digital Assistant), a soft phone, a wireless device, a wireless telephone, a cell phone, and a TTI (Thin Trunk Interface).

54. An article of manufacture according to claim 51 wherein the network device is a VoIP (Voice over Internet Protocol) telephone.

55. In a network device, a method comprising:
processing a call between the network device and a first other network device; and
responsive to receiving a user input requesting a call transfer to a second other network device, delivering call transfer functionality by:
a) initiating a connection from the network device to the second other network device; and
b) sending a message to the first other network device containing a reference to the second other network device.

56. In a network device, a method comprising:
processing a call between the network device and a first other network device; and
participating in a call transfer of the call by:
responding to a first message from the first other network device containing a reference to a second other network device by establishing a media path with the second other network device.

57. In a network device, a method comprising:
participating in a call set up of a call between the network device and a first other network device; and
participating in a call transfer of the call between the first other network device and a second other network device by:
after receiving a first message from the second other network device initiating a connection between the network device and the second other network device, responding to a second message from the first other network device containing a reference to the second other network device by replacing the connection between the network device and the second other network device with an other connection between the network device and the first other network device.

* * * * *